(12) United States Patent
Gross et al.

(10) Patent No.: US 12,399,492 B2
(45) Date of Patent: Aug. 26, 2025

(54) ARTIFICIAL INTELLIGENCE METHODS AND SYSTEMS FOR REMOTE MONITORING AND CONTROL OF AUTONOMOUS VEHICLES

(71) Applicant: GUIDENT, LTD., Miami, FL (US)

(72) Inventors: Clifford Gross, Miami, FL (US); Harald Braun, Highland Beach, FL (US)

(73) Assignee: Guident Corp., Boca Raton, FL (US)

( * ) Notice: Subject to any disclaimer, the term of this patent is extended or adjusted under 35 U.S.C. 154(b) by 163 days.

(21) Appl. No.: 17/909,432

(22) PCT Filed: Mar. 5, 2020

(86) PCT No.: PCT/US2020/021171
§ 371 (c)(1),
(2) Date: Sep. 5, 2022

(87) PCT Pub. No.: WO2021/177964
PCT Pub. Date: Sep. 10, 2021

(65) Prior Publication Data
US 2023/0138112 A1    May 4, 2023

(51) Int. Cl.
*G05D 1/00* (2024.01)
*B60Q 9/00* (2006.01)
(Continued)

(52) U.S. Cl.
CPC .......... *G05D 1/0027* (2013.01); *B60Q 9/008* (2013.01); *B60W 30/06* (2013.01);
(Continued)

(58) Field of Classification Search
None
See application file for complete search history.

(56) References Cited

U.S. PATENT DOCUMENTS

| 8,874,301 B1 | 10/2014 | Rao |
| 9,120,484 B1 | 9/2015 | Ferguson |

(Continued)

FOREIGN PATENT DOCUMENTS

| WO | WO2019147569 A1 | 8/2019 |
| WO | WO2019180700 A1 | 9/2019 |

OTHER PUBLICATIONS

Extended European Search Report, Aug. 16, 2023.
(Continued)

*Primary Examiner* — Adam R Mott
*Assistant Examiner* — Alan Lindsay Ostrow
(74) *Attorney, Agent, or Firm* — John Stellabotte; Danielle Cohen; Ellenoff Grossman & Schole

(57) ABSTRACT

Apparatus and methods relate to a controller configured to monitor incident risk levels of multiple independently governed autonomous vehicles remote from the controller simultaneously; and, in response to an unsafe incident risk level for one or more vehicles, take control of vehicles having an unsafe incident risk level, to restore a safe incident risk level; and, in response to determining incident risk has been restored to a safe level, returning control to the autonomous vehicles. Incident risk may be determined for multiple vehicles individually, and as a group, based on data from sensors distributed across multiple vehicles. Sensor data from multiple vehicles may be fused, permitting accurate incident risk determination for a vehicle group. Safety measures may be targeted by artificial intelligence to an individual vehicle or a vehicle group, to reduce incident risk by increasing separation between vehicles, or reducing vehicle speed.

23 Claims, 14 Drawing Sheets

(51) Int. Cl.
  *B60W 30/06* (2006.01)
  *B60W 60/00* (2020.01)
  *G08G 1/01* (2006.01)
  *G08G 1/04* (2006.01)
  *G08G 1/16* (2006.01)

(52) U.S. Cl.
  CPC ....... *B60W 60/0015* (2020.02); *G05D 1/0038* (2013.01); *G08G 1/0112* (2013.01); *G08G 1/0133* (2013.01); *G08G 1/0145* (2013.01); *G08G 1/04* (2013.01); *G08G 1/164* (2013.01); *G08G 1/166* (2013.01); *B60W 2420/403* (2013.01); *B60W 2554/20* (2020.02); *B60W 2554/4042* (2020.02); *B60W 2554/802* (2020.02); *B60W 2556/45* (2020.02)

(56) References Cited

U.S. PATENT DOCUMENTS

| | | | |
|---|---|---|---|
| 9,429,943 B2 | 8/2016 | Wilson | |
| 9,475,496 B2 | 10/2016 | Attard | |
| 9,964,948 B2 | 5/2018 | Ullrich | |
| 10,545,024 B1 | 1/2020 | Konrardy | |
| 10,699,580 B1 | 6/2020 | Gross | |
| 10,747,234 B1* | 8/2020 | Konrardy | G01C 21/362 |
| 2016/0297431 A1* | 10/2016 | Eigel | B60W 30/18109 |
| 2017/0308082 A1* | 10/2017 | Ullrich | B60W 30/18 |
| 2018/0011485 A1* | 1/2018 | Ferren | G05D 1/0038 |
| 2018/0046182 A1 | 2/2018 | Joyce et al. | |
| 2018/0120854 A1 | 5/2018 | Buburuzan et al. | |
| 2019/0163176 A1 | 5/2019 | Wang et al. | |
| 2019/0236955 A1* | 8/2019 | Hu | G08G 1/096741 |
| 2020/0001865 A1* | 1/2020 | Stobbe | B60R 21/0132 |
| 2020/0166897 A1* | 5/2020 | Campos | G08G 1/0133 |
| 2020/0372727 A1* | 11/2020 | Sudhir | G08B 25/016 |

OTHER PUBLICATIONS

European Written Opinion, Mar. 21, 2023.
Office Action Issued by The Korean Intellectual Property Office, Oct. 4, 2022 for Korean Patent Application No. 10-2022-7034516.
Translation of Office Action Issued by The Korean Intellectual Property Office, Oct. 4, 2022 for Korean Patent Application No. 10-2022-7034516.
Examiner's Report Issued by The Canadian Intellectual Property Office, Mar. 7, 2025 for Canadian Patent Application No. 3170561.

* cited by examiner

ARTIFICIAL INTELLIGENCE METHODS AND SYSTEMS FOR REMOTE MONITORING AND CONTROL OF AUTONOMOUS VEHICLES

CROSS-REFERENCE TO RELATED APPLICATIONS

This application claims the benefit of PCT/US2020/021171 filed on Mar. 5, 2020 entitled ARTIFICIAL INTELLIGENCE METHOD AND SYSTEMS FOR REMOTE MONITORING AND CONTROL OF AUTONOMOUS VEHICLES, the entire disclosure of which is incorporated herein by reference.

TECHNICAL FIELD

The present disclosure is directed to methods and systems for intelligent, remote monitoring and control of autonomous vehicles. More specifically, the present disclosure is directed to methods and systems employing distributed sensor fusion and artificial intelligence techniques to remotely monitor multiple independently operating autonomous vehicles to simultaneously determine the incident risk level for each of the vehicles, take control of one or more of the autonomous vehicles to restore a safe risk margin when an unsafe incident risk level is determined, and return control to the autonomous vehicles when the incident risk level has been restored to a safe margin.

BACKGROUND

Vehicle-accident related fatalities, especially those caused by human errors, exceed more than one million every year worldwide. In response to such statistics, a variety of safety measures have been proposed. In particular, in the United States, the US Department of Transportation (USDOT) in collaboration with state-level DOTs and experts nationwide have pursued the development of the Dedicated ShortRange Communications (DSRC) technology and related standards, which are designed for significantly improving safety measures through (vehicle-to-pedestrian) (V2P), vehicle-to-vehicle (V2V) and vehicle-to-infrastructure (V2I) communications. The USDOT pilot test program concluded that DSRC can reduce vehicle-related accidents significantly. The USDOT also issued a recommendation that the DSRC technology should be mandated for all new light vehicles in the near future.

One important category of vehicle-related accidents involves pedestrian-vehicle collision. In the US in 2015, the number of pedestrian fatalities caused by vehicle accidents was 5,376, a 23% increase from 2009. Pedestrians' fatality is one of the few categories that experienced an increase in the past few years. Furthermore, most of the pedestrian accidents happen in urban areas.

One of the many accident scenarios that involve pedestrians is when a stopping vehicle occludes a crossing pedestrian from being viewed by other vehicles. A second passing vehicle's driver only notices the presence of a crossing pedestrian after the pedestrian is within a very close proximity to the second vehicle as shown in FIG. 6. In such scenario, the passing vehicle driver may fail to stop the vehicle in a timely manner, due to the close proximity to the pedestrian, and this leads to a potential injury or even fatality for the pedestrian.

A broader category of accidents includes bicyclists and motorcyclists in addition to pedestrians improved communications technologies also can reduce accidents for these vulnerable road users (VRUs).

A variety of new vehicle models typically include an Advanced Driver Assistant System (ADAS) that helps prevent pedestrian and other forms of accidents. The success of such a system usually depends on the distance between the moving vehicle and pedestrian and on the vehicle speed.

Autonomous vehicles (AVs) use various computer processing systems to control operation of a vehicle. Autonomous vehicles may require an initial input from an operator, such as a pilot, driver, or passenger to engage the autonomous operation system and then operate thereafter in modes with varying degrees of human input ranging from level 3 to level 4 or 5 autonomous mode (where the vehicle essentially drives itself) to permitting a human operator to fully override the autonomous mode and have full manual control over the vehicle, and the full range of modes between the two extremes, with the potential for intermittent human input and control. Autonomous vehicles may include sensors, cameras, sonar, and radar to detect cars, pedestrians, and their respective proximities and characteristics. They may also rely on Global Positioning Systems (GPS) for navigation and other forms of communication technologies based on sensoric or Near Field Communication (NFC), including NFC peer-to-peer, which enables two NFC-enabled devices to communicate with each other to exchange information in an ad hoc fashion up to a distance up to 20 to 30 cm The detection and identification of objects and information related to objects and navigation capabilities are critical to the safe operation of autonomous vehicles.

There is a high degree of uncertainty about the safety of AVs using AI which hampers mass adaption of Level 4 or Level 5 AVs. Regulatory requirements in some jurisdictions make it mandatory to have back-up human operators taking control of an AV in the event of an accident or mishap. These operators may be located in the vehicle or located remotely.

There have been methods and systems directed to autonomous vehicle operation. For example, U.S. Pat. No. 9,475,496 describes autonomous driving sensors that can be configured to monitor, among other things, road conditions, environmental conditions, occupants in the vehicle, and whether one of the occupants is a driver.

U.S. Pat. No. 9,120,484 describes an autonomous driving computer system that may use visual or audible cues to indicate whether it is obtaining valid data from one or more sensors, whether it is partially or completely controlling the direction or speed of the autonomous vehicle, or both, such as whether there are any errors, etc. In addition, autonomous driving computer systems may also have external indicators which indicate whether, at the moment, a human or an automated system is in control of the vehicle, that are readable by humans, other computers, or both.

Some method and system implementations for operating an autonomous vehicle include collision avoidance systems adapted to relieve drivers from the moment-to-moment decision making involved in driving, while seeking to avoid collisions. For example, U.S. Pat. No. 9,429,943, filed by Florida A&M University, the entire disclosure of which is incorporated herein by reference, describes artificial intelligence valet (AIV) systems and methods adapted to control vehicles based on cognitive and control techniques. The artificial intelligence valet (AIV) system can include current mobile technology, fuzzy logic, and neural networks that enable the vehicle to navigate to the vehicle's user. While an autonomous vehicle is operating under AIV control, the AIV system can recognize when a collision with an object such as, e.g., a human, an animal, another car or any combination thereof is inevitable due to unforeseen situations. In response to such a determination, evasive actions can be initiated to intelligently avoid the collision or, in the worst case scenario, to decide which object to collide with if faced with an inevitable collision. After the collision, the collision avoidance system can initiate a call to emergency services and safely park the vehicle. In some implementations, the vehicle may be parked without emergency services being contacted if no injury has occurred. However, U.S. Pat. No. 9,429,943 does not specify monitoring multiple independent autonomous vehicles, taking control of one or more of the independent autonomous vehicles to govern the vehicles' operation, and returning control to the one or more independent autonomous vehicles when safe operation is restored.

Although the safety of autonomous vehicle operation has improved, the potential for dangerous autonomous vehicle safety shortfalls remains. In some autonomous vehicle scenarios, unsafe conditions can result from malfunction of sensors, or software's inability to resolve unforeseen situations (e.g., dead-lock situations involving pedestrians in a mixed-use street), security concerns resulting from the absence of a driver, and the missing option for a passenger to ask a driver or attendant for information or assistance.

Some autonomous vehicle implementations include methods and systems to help increase safety and consumer satisfaction with autonomous vehicles and help bridge the gap towards complete autonomy. For example, U.S. Pat. No. 9,964,948, filed by The Florida International University Board of Trustees, the entire disclosure of which is incorporated herein by reference, describes methods and systems for assisting autonomous vehicles. A method for assisting autonomous vehicles can include providing an autonomous vehicle having sensory inputs and providing a remote control center having two-way communication with the autonomous vehicle. The autonomous vehicle can send its sensory input information to the control center and the control center can send control information to the autonomous vehicle. However, U.S. Pat. No. 9,964,948 does not specify monitoring multiple independent autonomous vehicles, taking control of one or more of the independent autonomous vehicles to govern the vehicles' operation when a dangerous operating safety condition is detected, and returning control to the one or more independent autonomous vehicles when safe operation is restored.

Notwithstanding the substantial effort that goes into designing autonomous vehicles so that they can be operated safely, there will be instances where incidents, such as collisions, accidents, and other emergency conditions occur. Collisions, accidents, and other emergency conditions can result in additional problems when vehicles are operating autonomously.

Automated vehicle systems also include safe shut down and emergency response and accident reporting modes. For example, U.S. Pat. No. 8,874,301 describes a vehicle with autonomous driving control that has a set up mode, active drive mode, safe shutdown mode, and emergency response mode.

Such collision avoidance and accident reporting systems could be improved by making more precise assessments of the nature of the injuries and damage that has occurred following an incident, including more precise assessments of the number of vehicles, passengers, pedestrians, animals and objects involved and the nature of the injuries and damages to them.

Some automated vehicle examples include methods and systems for transferring control of an automated vehicle to a passenger or emergency responder, in the event of an accident or emergency. For example, U.S. patent application Ser. No. 16/386,530 filed by Guident, Ltd., describes methods and systems for transferring control of an automated vehicle to a passenger or emergency responder in the event of an accident or emergency. The system can be used in conjunction with automated vehicle artificial intelligence systems operating with collision or incident avoidance, and improved accident or emergency reporting. A distributed information system (DISS) receives information from a plurality of distributed sensors in a single autonomous vehicle, determines the existence of an incident based upon the information received from the plurality of distributed sensors, determines vehicles, passengers, and pedestrians, animals and objects involved in the incident and the nature of the injuries and damages to the vehicles, passengers, and pedestrians, animals and objects involved in the incident based on the information received from the sensors, determines if the autonomous vehicle can be safely moved autonomously from a location where the incident occurred to a second location, and if the autonomous vehicle can safely be moved to the second location, autonomously moves the vehicle to the second location and parks the vehicle. The methods and systems described by U.S. patent application Ser. No. 16/386,530 may integrate different information types received from different sensor types using novel sensor fusion techniques, to determine the existence of an incident, determine vehicles, persons, animals, or objects involved, and determine if the single autonomous vehicle can safely be moved. However, U.S. patent application Ser. No. 16/386,530 does not specify monitoring multiple independent autonomous vehicles, taking control of one or more of the independent autonomous vehicles to govern the vehicles' operation when a dangerous operating safety condition is detected, and returning control to the one or more independent autonomous vehicles when safe operation is restored.

There may be instances where an automated vehicle may not be able to be parked safely autonomously and emergency responders may need to be notified. For example, if an autonomously operated vehicle gets in an accident in a busy intersection or highway, where other cars will be driving, the autonomously operated vehicle may need to be shut down to prevent additional damage or injury. The autonomous vehicle may also need to be moved out of the way autonomously or manually so that traffic can proceed, and to ensure the safety of the autonomous vehicle passengers, other drivers, and pedestrians.

U.S. Pat. No. 9,475,496 describes methods and systems to override automated control of a vehicle. An override may automatically occur if, for instance, one of the occupants requires emergency services. During an emergency services override, the vehicle may be permitted to autonomously or non-autonomously travel to a police department, a fire department, a hospital, a refueling station, or the like. It also describes that in some instances, an emergency service provider, such as a 911 operator, may remotely override one or more driving restrictions that would otherwise prevent the vehicle from allowing one or more occupants to seek emergency services. An override may automatically occur if, for instance, one of the occupants requires emergency services. During an emergency services override, the vehicle may be permitted to autonomously or non-autonomously travel to a police department, a fire department, a hospital, a refueling station, or the like, but U.S. Pat. No. 9,475,496 does not specify how that override is implemented. It provides that an override may be transmitted to the owner's cell phone or email address, for instance, and may receive a response from the owner's cell phone or email address that either permits or rejects the override request. If permitted, the processing device may temporarily disable one or more of the driving restrictions. If the override request is rejected, the processing device may output a message to the occupant via, e.g., the user interface device indicating that the override request has been denied. The processing device may control the operation of the vehicle according to the driving restrictions associated with the selected profile. The owner may wish to grant the override request on a case-by-case basis as a reward or other incentive to the occupant.

Although U.S. Pat. No. 9,475,496 describes override requests being transmitted to the owner's cell phone or email address, for instance, and receiving a response from the owner's cell phone or email address that either permits or rejects the override request. But if the owner is not available, not available to respond quickly, or is incapacitated, it will be necessary to be able to transfer or hand off control of the automated vehicle to an emergency responder without receiving approval from the owner. Waiting to receive approval from the owner could result in injured persons not receiving timely attention and care. It also could create risk of further accidents and injuries, where a vehicle cannot be promptly moved out of the way of traffic.

There may be accident scenarios that involve pedestrians, when a stopping vehicle occludes a crossing pedestrian from being viewed by other vehicles. In such a scenario, the second passing vehicle's driver only notices the presence of a crossing pedestrian after the pedestrian is within a very close proximity to the second vehicle.

Some autonomous vehicle implementations include methods and systems to share data across vehicles for improved safety in scenarios presenting an autonomous vehicle with an occluded object. For example, PCT Patent Application PCT/US19/14547, filed by the Board of Trustees of Michigan State University, the disclosure of which is incorporated herein by reference, describes distributed object detection based on sensor data shared across multiple autonomous vehicles using sensor fusion techniques. PCT/US19/14547 also describes a collision avoidance system configured to automatically brake one or more of the multiple autonomous vehicles based on the object detection. However, PCT/US19/14547 does not specify monitoring multiple independent autonomous vehicles, taking control of one or more of the independent autonomous vehicles to govern the vehicles' operation when a dangerous operating safety condition is detected, and returning control to the one or more independent autonomous vehicles when safe operation is restored.

What is needed are improved methods and systems for monitoring multiple independent autonomous vehicles that can be used in conjunction with automated vehicle artificial intelligence systems, operating with collision or incident avoidance, and improved accident or emergency reporting, to take control of one or more of the independent autonomous vehicles to govern the vehicles' operation when a dangerous operating safety condition is detected, and return control to the one or more independent autonomous vehicles when safe operation is restored.

This section provides background information related to the present disclosure which is not necessarily prior art.

SUMMARY

Apparatus and associated methods relate to configuring a controller to simultaneously monitor the incident risk levels of multiple independently governed autonomous vehicles remote from the controller; and, in response to an unsafe incident risk level for one or more vehicle determined by the controller, taking control of the one or more autonomous vehicle having an unsafe incident risk level, to restore a safe incident risk level; and, in response to determining incident risk has been restored to a safe level, returning control to the autonomous vehicles. In an illustrative example, incident risk may be determined for each of the multiple vehicles individually, and as a group, based on data from sensors distributed across the multiple vehicles. Sensor data from multiple vehicles may be fused, permitting accurate incident risk determination for a group of the vehicles. In some examples, safety measures may be targeted by artificial intelligence to an individual vehicle or a vehicle group, to reduce incident risk to a safe level, based on increasing the separation between vehicles, or reducing vehicle speed.

Various embodiments in accordance with the present disclosure provide methods and systems employing distributed sensor fusion and artificial intelligence techniques for remote monitoring of multiple independently operating autonomous vehicles to simultaneously determine the incident risk level for one or more vehicles, taking control of one or more of the autonomous vehicles upon determining the incident risk level of at least one of the autonomous vehicles exceeds a safe incident risk level by at least a predetermined safe risk margin, and returning control to the autonomous vehicles when the incident risk level has been restored to a safe margin. In an illustrative example, some embodiment implementations include remote monitoring and control of independently operating autonomous vehicles based on artificial intelligence, visual sensor fusion, and data sharing, between the vehicles and a monitoring and control center remote from the vehicles, for increased safety based on artificial intelligence, reduced incident response latency, and increased responder awareness and availability.

In particular, the present disclosure is directed to networked remote monitoring and control centers monitoring multiple groups of independently operating autonomous vehicles based on artificial intelligence, visual sensor fusion, and data sharing, between the vehicles and at least one networked monitoring and control center near the vehicles, for improved safety as a result of reduced monitoring and control latency due to the proximity of the remote monitoring and control center to the vehicles.

In one aspect, an autonomous vehicle remote monitoring and control center (RMCC) apparatus is provided, comprising: at least one processing device, the RMCC programmed and configured to: receive sensor data captured by a plurality of sensors distributed across a plurality of independently governed autonomous vehicles operating remotely from the RMCC, the sensor data including data of vehicles not operating under control of the RMCC; simultaneously determine an incident risk level of each of the plurality of independently governed autonomous vehicles operating remotely from the RMCC; in response to the incident risk level determined as not safe by the RMCC for one or more of the plurality of independent vehicles, take control of the one or more of the plurality of autonomous vehicles operating at the incident risk level that is not safe, to restore the vehicles operating at the incident risk level that is not safe to a safe incident risk level; and, in response to determining the incident risk has been restored to the safe incident risk level, return control to the one or more autonomous vehicle that were operating at the incident risk level that was not safe.

In another embodiment, the RMCC is programmed and configured to determine the incident risk level based on artificial intelligence configured as a function of the sensor data received from the plurality of autonomous vehicles.

In another embodiment, the incident risk level is determined by the RMCC as a function of sensor data independently captured from at least two different vehicles.

In another embodiment, the RMCC is programmed and configured to fuse the sensor data independently captured from at least two different vehicles.

In another embodiment, the RMCC is programmed and configured to determine an incident risk margin calculated as a function of comparing the incident risk level with a predetermined minimum safe risk level threshold.

In another embodiment, the RMCC is programmed and configured to determine the incident risk level is unsafe based on determining the incident risk margin is less than a predetermined safe minimum risk margin.

In another embodiment, the RMCC is programmed and configured to determine the incident risk level is dangerous based on determining a slope of the incident risk margin sampled for a predetermined time period is negative.

In another embodiment, the RMCC is programmed and configured to determine the incident risk level is safe based on determining the incident risk margin is equal to or greater than a predetermined safe minimum risk margin.

In another aspect, an autonomous vehicle remote monitoring and control center (RMCC) apparatus is provided, comprising: at least one processing device, the RMCC programmed and configured to: receive sensor data captured by a plurality of sensors distributed across a plurality of independently governed autonomous vehicles operating remotely from the RMCC, the sensor data including data of vehicles not operating under control of the RMCC; determine an incident risk level for each one of a plurality of independently governed autonomous vehicles operating remotely from the RMCC, wherein the incident risk level is determined based on artificial intelligence trained as a function of received fused sensor data captured by a plurality of sensors distributed across the plurality of autonomous vehicles; determine an incident risk margin calculated as a function of comparing the incident risk level with a predetermined minimum safe risk level threshold; in response to determining the incident risk margin is less than the predetermined safe minimum risk margin: take control of one or more of the plurality of autonomous vehicles operating with the incident risk margin less than the predetermined safe minimum risk margin, to restore a safe incident risk level by implementing one or more safety measure in at least one vehicle; and, in response to determining the incident risk has been restored to a safe incident risk level based on comparing the incident risk to the predetermined safe minimum risk margin, return control to the one or more autonomous vehicles operating with the incident risk margin less than the predetermined safe minimum risk margin; and, in response to determining the incident risk margin is equal to or greater than a predetermined safe minimum risk margin, determine the incident risk level is safe.

In another embodiment, the fused sensor data further comprises data encoding an object image captured from at least one of the plurality of autonomous vehicles imposed on a field of view image captured from another vehicle not operating under the RMCC.

In another embodiment, the fused sensor data further comprises data encoding location.

In another embodiment, the fused sensor data further comprises data encoding a separation distance between one vehicle of the plurality of vehicles and at least one other vehicle of the plurality of vehicles.

In another embodiment, the fused sensor data further comprises data encoding a distance between one vehicle of the plurality of vehicles and a fixed object.

In another embodiment, the safety measure further comprises increasing a separation distance between at least two vehicles based on changing a velocity of at least one vehicle of the plurality of vehicles.

In another embodiment, the safety measure further comprises changing a direction of at least one vehicle to avoid collision.

In another aspect, an autonomous vehicle remote monitoring and control center (RMCC) apparatus is provided, comprising: at least one processing device, the RMCC programmed and configured to: receive sensor data captured by a plurality of sensors distributed across a plurality of independently governed autonomous vehicles operating remotely from the RMCC, the sensor data including data of vehicles not operating under control of the RMCC; determine an incident risk level of a plurality of independently governed autonomous vehicles remote from the RMCC, wherein the incident risk level is determined based on artificial intelligence trained as a function of received fused image sensor data captured by a plurality of sensors distributed across the plurality of autonomous vehicles, and wherein the incident risk level is determined based on a criterion determining whether an object visually encoded by the image sensor data captured from one vehicle is of interest to at least another of the vehicles; determine an incident risk margin calculated as a function of comparing the incident risk level with a predetermined safe risk level threshold, wherein the safe risk level threshold is predetermined by artificial intelligence configured as a function of historical training data captured by a test vehicle sensor; in response to determining the incident risk margin is less than a predetermined safe minimum risk margin: take control of one or more of the plurality of autonomous vehicles operating at the incident risk margin that is less than the predetermined safe minimum risk margin, to restore a safe incident risk level for the vehicles based on governing the operation of the plurality of vehicles to increase the separation distance between at least two vehicles based on changing the velocity vector of at least one vehicle of the plurality of autonomous vehicles; and, in response to determining the incident risk has been restored to a safe level based on comparing the incident risk to the predetermined safe minimum risk margin, return control to the one or more of the plurality of autonomous vehicles; and, in response to determining the incident risk margin is equal to or greater than a predetermined safe minimum risk margin, determine the incident risk level is safe; in response to determining the existence of an incident based upon the information received from the plurality of distributed sensors: determine vehicles, passengers, pedestrians, animals and objects involved in the incident and a nature of injuries and damages to the vehicles, passengers, pedestrians, animals and objects involved in the incident based on the information received from the sensors; determine if the autonomous vehicle can be safely moved autonomously from a location where the incident occurred to a second location; and, in response to determining the autonomous vehicle can safely be moved to the second location autonomously, move the vehicle to the second location and park the vehicle.

In another embodiment, the RMCC is programmed and configured in response to determining the incident risk level is safe, to display a human-visible green indication on an RMCC monitor.

In another embodiment, the RMCC is programmed and configured in response to determining the incident risk level is dangerous, to display a human-visible yellow indication on an RMCC monitor.

In another embodiment, the RMCC is programmed and configured wherein in response to determining the incident risk level is unsafe, display a human-visible red indication on an RMCC monitor.

Also described in detail herein below, are improved, novel methods and systems for transferring control of an automated vehicle to a passenger or emergency responder in the event of an accident or emergency, that can be used in conjunction with automated vehicle artificial intelligence systems operating with collision avoidance, and improved accident or emergency reporting.

In another aspect, a remote monitoring and control center (RMCC) is provided, comprising: at least one processing device, the RMCC programmed and configured to receive information from a plurality of distributed sensors in a plurality of autonomous vehicles; determine the existence of an incident based upon the information received from the plurality of distributed sensors; determine vehicles, passengers, pedestrians, animals and objects involved in the incident and a nature of the injuries and damages to the vehicles, passengers, pedestrians, animals and objects involved in the incident based on the information received from the sensors; determine if the autonomous vehicle can be safely moved autonomously from a location where the incident occurred to a second location; if the autonomous vehicle can safely be moved to the second location, autonomously move the vehicle to the second location and park the vehicle.

Various implementation embodiments in accordance with the present disclosure may be configured to govern autonomous vehicle operation based on artificial intelligence, sensor, and distributed information sharing techniques as described with reference to FIGS. 1-5 of U.S. patent application Ser. No. 16/386,530, titled "Methods and Systems for Emergency Handoff of an Autonomous Vehicle," filed by Guident, Ltd. on Apr. 17, 2019, incorporated herein by reference.

Various implementation embodiments in accordance with the present disclosure may be configured to improve autonomous vehicle accident avoidance based on distributed visual sensor fusion and data sharing techniques as described with reference to FIGS. 1-10 of PCT Patent Application PCT/US19/14547, titled "Visual Sensor Fusion and Data Sharing Across Connected Vehicles for Active Safety," filed by Board of Trustees of Michigan State University on Jan. 22, 2019, incorporated herein by reference.

In some embodiments, the RMCC is programmed and configured further to shut down one or more of the plurality of automated vehicle if the RMCC determines that the autonomous vehicle cannot be moved safely from the location where the incident occurred to a second location.

In some embodiments, the RMCC is programed and configured further to contact an emergency responder.

In some embodiments, the RMCC is programmed and configured further to provide the emergency responder with a number of vehicles, passengers, pedestrians, animals and objects involved in the incident and the nature of the injuries and damages to the vehicles, passengers, pedestrians, animals and objects involved in the incident.

In some embodiments, the RMCC is programmed and configured further to determine when an emergency responder arrives at the automated vehicle based on information received from the plurality of distributed sensors.

In some embodiments, the RMCC is programmed and configured further to receive a request to transfer control of one or more of the plurality of vehicles from an emergency responder user device; and in response to the request from the emergency responder user device, transfer control of the automated vehicle to the emergency responder without requiring approval from an owner of the vehicle.

In some embodiments, the RMCC is programmed and configured further to require the request from the emergency responder to contain a unique identification number and be communicated from the emergency responder user device using encryption techniques.

In some embodiments, the unique identification number of the emergency responder is stored in the RMCC as trusted.

In some embodiments, the RMCC is programmed and configured further to require the request from the emergency provider user device to be communicated using a handshake with the RMCC or permitting the owner to prevent the transfer.

In some embodiments, the RMCC is programmed and configured further to communicate information related to the incident to an owner of the vehicle or other interested party.

In another aspect, a method is provided for determining a response to an incident involving one or more autonomous vehicle, comprising: receiving information from a plurality of distributed sensors configured in the plurality of autonomous vehicles at a distributed information system (RMCC) in electronic communication with a plurality of autonomous vehicles; determining the existence of an incident involving at least one vehicle of the plurality of vehicles based upon the information received from the plurality of distributed sensors; determining vehicles, passengers, pedestrians, animals and objects involved in the incident and a nature of injuries and damages to the vehicles, passengers, pedestrians, animals and objects involved in the incident based on the information received from the sensors; determining if the at least one autonomous vehicle can be safely moved autonomously from a location where the incident occurred to a second location; and, if the at least one autonomous vehicle can safely be moved to the second location autonomously, move the at least one vehicle to the second location and park the at least one vehicle.

In some embodiments, the method further comprises shutting down at least one autonomous vehicle if the RMCC determines that the at least one autonomous vehicle cannot be moved safely from the location where the incident occurred to a second location.

In some embodiments, the method further comprises the RMCC contacting an emergency responder.

In some embodiments, the method further comprises providing the emergency responder with the number of vehicles, passengers, and pedestrians, animals and objects involved in the incident and the nature of the injuries and damages to the vehicles, passengers, pedestrians, animals and objects involved in the incident.

In some embodiments, the method further comprises the RMCC determining when an emergency responder arrives at the at least one automated vehicle based on information received from the plurality of distributed sensors.

In some embodiments, the method further comprises receiving a request from an emergency responder user device to transfer control of the vehicle to the emergency responder user device; and in response to the request from the emergency responder user device, transfer control of the autonomous vehicle to the emergency responder without requiring approval from an owner of the vehicle.

In some embodiments, the request from the emergency responder is required to contain a unique identification number and be communicated from the emergency responder user device to the RMCC using encryption techniques.

In some embodiments, the unique identification number of the emergency responder is stored in the RMCC as trusted.

In some embodiments, the request from the emergency provider user device is communicated using a handshake with the RMCC.

In some embodiments, the RMCC communicates information related to the incident to an owner of the at least one vehicle or other interested party.

It is an object of the present disclosure to lower the barrier of entry to autonomous vehicle deployment and enhance the trust in using AV technology, based on providing an embodiment Remote Tele-Monitoring and Control Center (RMCC) for autonomous vehicles and land based drones applying Artificial Intelligence (AI), Cybersecurity and Data Analytics.

It is an object of the present disclosure to identify situations having a high probability of accidents, and prevent the accidents from occurring, based on configuring a controller to with improved Artificial Intelligence to monitor the incident risk level of multiple independently governed autonomous vehicles remote from the controller; and, in response to an unsafe incident risk level determined by the controller, taking control of the autonomous vehicles to restore a safe incident risk level; and, in response to determining the incident risk has been restored to a safe level, returning control to the autonomous vehicles.

It is an object of the present disclosure to provide an RMCC that will assist vehicles post-accident with first responder reach out and vehicle relocation through remote control to a preferred location when possible.

It is an object of the present disclosure to reduce the reaction time required for a group of AVs to implement a safety measure in response to an unsafe condition determined by an embodiment RMCC. Such reduced reaction time to implement a safety measure may be a result of a network of multiple RMCCs in close proximity to the area being monitored, permitting improved reaction time as a result of reduced communication latency.

It is an object of the present disclosure to minimize emergency response times, save lives, and reduce the severity of injuries, while minimizing workload on emergency responders and RMCC operators. This facilitation may be a result of providing improved Artificial Intelligence configured to assign a risk of mishap, in real time, to all vehicles being monitored.

It is an object of the present disclosure to reduce the frequency and severity of autonomous vehicle accidents. Such reduced autonomous vehicle accident frequency and severity may be a result of improved Artificial Intelligence models adapted to take over control of vehicles with a high likelihood of accident occurrence, to either reduce their speed or re-route them until the risk level is reduced to a safe margin, whereupon control is handed back to the vehicle.

It is an object of the present disclosure to reduce response times when a human tele-operator needs to take over control of AVs/ADDS (Autonomous Delivery Drones) post-accident and post-mishap. Such reduced response times may be a result of providing new AI software, utilizing Data Analytics tools and Cyber Security Software in an advanced Artificial Intelligence (AI) assisted RMCC for autonomous vehicles (AV) and autonomous delivery drones (ADD), with the goal to take preventative measures and action to avoid accidents before they happen.

It is an object of the present disclosure to reduce the response times of the teleoperators to an AV in need of assistance. This facilitation may be a result of providing an AI enabled remote tele-monitoring and control center for AVs/ADDs that can be scaled to remotely monitor hundreds of thousands of AVs.

It is an object of the present disclosure to reduce AV operator effort managing groups of AVs. Such reduced AV operator effort may be a result of providing a state-of-the-art operational console for vehicle monitoring and control combined with special purpose AI software algorithms that will a priori identify high risk candidates for viewing. In an illustrative example, risk may be calculated from a combination of vehicle distance to other objects, vehicle speed, road conditions, traffic congestion and weather conditions, among other inputs.

In some RMCC embodiment implementations, data may be streamed and analyzed from cloud-based, peer-to-peer sensors and other mobility network real time information sets. In various designs, data may be combined to provide a real-time risk factor assigned to each monitored vehicle, enabling the system to prioritize AV's with a high likelihood of problem occurrence.

In another embodiment, some AV vehicle implementations may report an accident and request assistance.

In another embodiment, some AV vehicle implementations may be configured to permit the AV to park itself.

In another embodiment, some AV vehicle implementations may be configured to permit AV pickup/dropoff via a mobile device app.

In another embodiment, some AV vehicle implementations may be configured to direct the AV to a battery charging facility. to charge the AV battery.

Further areas of applicability will become apparent from the description provided herein. The description and specific examples in this summary are intended for purposes of illustration only and are not intended to limit the scope of the present disclosure.

This section provides a general summary of the disclosure, and is not a comprehensive disclosure of its full scope or all of its features.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
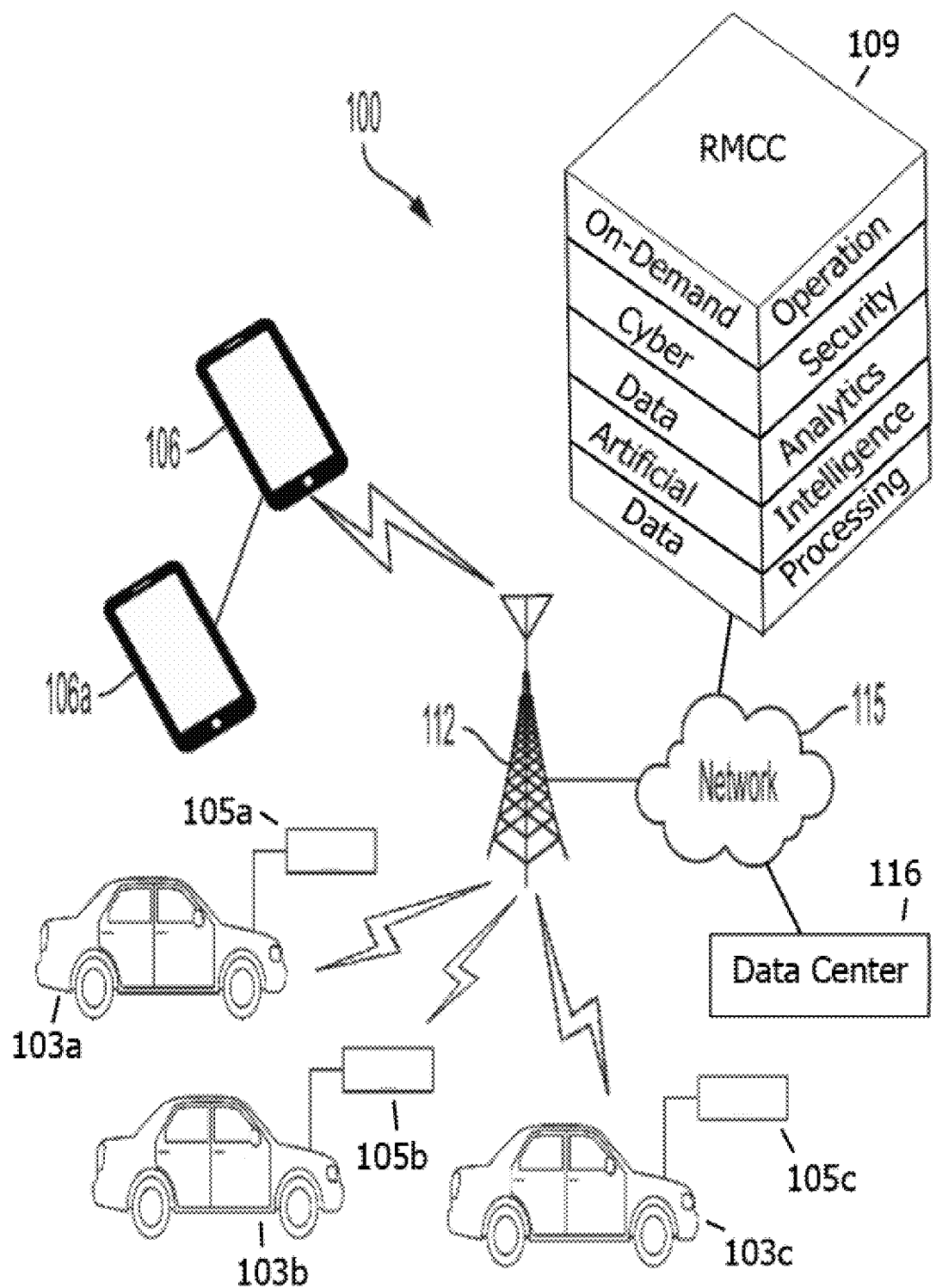
FIG. 1 is a graphical representation of various components of an artificial intelligence (AI) autonomous vehicle (AV) remote monitoring and control center (RMCC) system configured to supervise the operating safety of independently governed autonomous vehicles remote from the RMCC, take control of the autonomous vehicles to restore safe operation in response to unsafe operation recognized by the RMCC, and in response to determining safe vehicle operation has been restored, return control to the autonomous vehicles. The RMCC includes components, such as Data Analytics tools, Cyber Security Software, Data processing capabilities and the advanced Artificial Intelligence artificial (AI) software layer for an on-demand operation.

Disclosed herein are various embodiments related to remote monitoring and control of independently operating autonomous vehicles, based on artificial intelligence, visual sensor fusion, and data sharing, between the vehicles and a monitoring and control center remote from the vehicles, for improved safety. Reference will now be made in detail to the description of the embodiments as illustrated in the drawings, wherein like reference numbers indicate like parts throughout the several views.

Automated cognitive and control techniques can be used to relieve drivers from the mundane moment-to-moment decision making involved in driving. In the case of autonomous vehicles, features such as automated pick-up and drop-off services and pedestrian detection and avoidance offer convenience and safety to the user of the vehicle. An AI system for an autonomous vehicle can include current mobile technology, fuzzy logic and neural networks that enable the vehicle to navigate to its user. While an autonomous vehicle is operating under AI control, the AI system can recognize when a collision with an object such as, e.g., a human, an animal, another car, object, or any combination thereof is inevitable due to unforeseen situations. In response to such a determination, evasive actions can be initiated to intelligently avoid the collision or, in the worst case scenario, decide which object to collide with if faced with an inevitable collision. This system can be implemented as a "plug in and play" item from off the shelf or via a retrofit sale process or it can be built into a new or existing vehicle. This system can be extended to not only park a vehicle but it can also be used by the user to navigate to a destination whether or not the user is aboard the vehicle and the vehicle will be able to do so with no help from the user. For certain vehicles there may not be any passengers or drivers, as they may be limited to package delivery and other utilitarian services.

Additionally, autonomous vehicles can use GPS technology to map routes. The AI system can enable the vehicle to gradually learn driving patterns of the user. The AI system continually learns the driving behaviors of its user, using artificially intelligence techniques, so that when the vehicle operates autonomously it can mimic driving patterns of the user such as, e.g., preferred speeds, closeness to the curb, closeness to the center painted line, avoidance of potholes or other obstacles, and/or regularly traveled route. In addition, a context-aware web service may be employed to allow drivers to communicate commands and relay information to the vehicle to improve the performance of their vehicle. The information may also be used by other vehicles and users of the AI system. Any vehicle utilizing the AI system can relay information about the roads they are traversing to aid in path planning.

Referring to FIG. 1, shown is a graphical representation of various elements included in the AI system. For example, the AI system 100 can include autonomous vehicles 103a, 103b, and 103c, a user device 106, an emergency responder user device 106a, and a remote monitoring and control center (RMCC) 109, which includes processing circuitry and application software implementing various features of the AI system. In the illustrated example, the RMCC 109 includes Data Analytics and AI software modules integrated with Cyber Security and Data Processing implementations providing On-Demand Operation for AI-based AV remote monitoring and control services. To simplify description, the example depicted by FIG. 1 illustrates three autonomous vehicles 103a, 103b, and 103c, however, an embodiment AI system 100 and RMCC 109 may advantageously remotely monitor and control a greater number of similar autonomous vehicles. In various embodiments, the processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. In yet other embodiments, the processing circuitry may include one or more software modules executable within one or more processing circuits. The processing circuitry may further include memory configured to store instructions and/or code that causes the processing circuitry to execute data communication functions.

The vehicles 103a, 103b, and 103c, and user devices 106 and 106a can communicate via a wireless network 112 such as, e.g., a wireless local area network (WLAN) and/or cellular network. The vehicles 103a, 103b, and 103c can include processing circuitry (e.g., a transmitter, receiver, and/or transceiver) to support the wireless communications. User devices 106 and 106a can include mobile processing systems such as, e.g., cellular telephones, tablet computers, e-readers, mp3 players, and portable media players such as, e.g., iPod touches, and iPads. For example, the vehicles 103a, 103b, and 103c, and/or user devices 106 and 106a may support cellular communications such as, e.g., a cellular data connection such as third-generation (3G), fourth-generation (4G), long term evolution (LTE), fifth generation (5G), or other data communication standard. The vehicles 103a, 103b, and 103c, and/or devices 106 and 106a may support wireless communications such as, e.g., IEEE 802.11a/b/g/n and Wi-Fi 6, also known as 802.11ax. Processing circuitry of the vehicles 103a, 103b, and 103c, and user devices 106 and 106a can also support GPS capabilities to determine their geographical location. The AI system 100 can use applications that are independent of the user device platform or operating system (e.g., Android, iOS, webOS, Symbian, etc.) and/or the vehicle type, make, model, and manufacturer. Communication with the RMCC 109 can be carried out via a network 115 (e.g., the Internet) that is communicatively coupled to the wireless network 112. The RMCC 109 may be implemented as, e.g., a web service on a processing system such as one or more servers. Such web services can be used from a private or public Data Center (DC 116). The public Data Center 116 may be cloud-hosted, permitting decisions by the RMCC 109 determined as a function of AI-based learning from data accessible from the DC 116 and data accessible from the sensors 105a, 105b, and 105c configured respectively in the vehicles 103a, 103b, and 103c. The RMCC 109 may employ data fusion techniques to combine data accessible from the DC 116 with data from the sensors 105a, 105b, and 105c and the vehicles 103a, 103b, and 103c into composite data, and the RMCC may base decisions on AI-based learning from the composite data thus formed.

The RMCC 109 and AI system 100 can provide various features such as, e.g., autonomous passenger retrieval, autonomous parking, intelligent incident avoidance, intelligent incident reporting, gradual intelligent route learning, remote cabin control, and/or distributed information sharing. Autonomous passenger retrieval can allow either of the vehicles 103a, 103b, and 103c to independently retrieve their user. An application interface (or app) operating on the user devices 106 and 106a may be used to request the vehicles 103a, 103b, or 103c to collect the user at a specified location. The vehicles 103a, 103b, and 103c may directly map routes and navigate without human intervention as well as travel according to user specifications such as, e.g., using previously recorded routes. In some embodiments, the vehicles 103a, 103b, and 103c may include processing circuitry that can support the operation of the application interface. The RMCC 109 can support the recording and storage of routes as well as routing evaluation and recommendations. Autonomous parking can allow the vehicles 103a, 103b, and 103c to park themselves after dropping off their user without further user input or control. The vehicles 103a, 103b, and 103c may search out parking spots in the surrounding area as well as park in previously recorded parking areas or locations. The RMCC 109 can support the recording and storage of parking areas. When used together, any of the vehicles 103a, 103b, or 103c may be autonomously parked and retrieved by a user through the user devices 106 and in an emergency, emergency responder user device 106a.

Intelligent incident avoidance can identify objects that are potentially in the path of each of the vehicles 103a, 103b, and 103c, thereby allowing the vehicles 103a, 103b, and 103c to minimize potential injury and/or damage. Intelligent incident reporting can keep a user informed through the user devices 106 and 106a of when any of the vehicles 103a, 103b, or 103c are, e.g., touched, broken into, and/or hit by another vehicle. The user may define a level of vehicle interaction in the RMCC 109 to determine when the user wants to be informed about incidents. When an incident is detected, vehicle cameras may take pictures of the vehicle 103a, 103b, or 103c, and its surroundings and/or record audio and/or video around the time of detection. Gradual intelligent route learning can allow for driving patterns of the user to be learned and used by the vehicles 103a, 103b, and 103c during autonomous operation.

Remote cabin control can allow the user to control settings and/or determine conditions of the vehicles 103a, 103b, and 103c from the user devices 106 and 106a. For example, the user may be able to remotely operate windows, sun/moon roof, doors, trunk, side door mirrors, lights (e.g., cabin lights, exterior head lights, etc.), seat position and/or temperature, interior climate controls (e.g., air conditioning, heat, defogger and/or other model specific settings such as humidity), media devices (e.g., standard and/or XM radio, compact disc player, DVD player), and/or remotely start any vehicle 103a, 103b, or 103c. Control and/or status information may be communicated directly between the vehicle 103a, 103b, or 103c and user device 106 and 106a via the wireless network 115 and/or through the RMCC 109, which may store predefined control settings for each vehicle 103a, 103b, and 103c. The application interface may also allow the user devices 106 and 106a to retrieve diagnostic information from each vehicle 103a, 103b, or 103c for use by the user.

Distributed information sharing allows the AI system 100 to use information shared by users of the system to improve recommendations for parking or routing of other vehicles, as well as other features of the AI system 100. Shared information can include, but is not limited to, routes used by autonomous vehicles (including GPS route corrections), parking area locations, area parking patterns, reported instances of crime and/or vandalism, etc. Users of the AI system 100 may use user devices 106 and in an emergency, an emergency provider may use emergency responder user device 106a to share area information by submitting the information to the RMCC 109, which may then meld the shared information with information from standard map navigation sources and intelligent transportation systems to assist all users of the AI system 100. The RMCC 109 can facilitate sharing of information between any of the vehicles 103a, 103b, or 103c and user devices 106 and 106a, as well as sharing the information with other users of the AI system 100. For example, the shared information may allow a vehicle 103a, 103b, or 103c to autonomously travel to a user or to parking spots more efficiently. Shared information may also allow the autonomous vehicles 103a, 103b, or 103c to effectively operate within areas that were not previously visited by the user. Routing and/or parking suggestions may also be provided to assist a user who is manually operating any of the vehicles 103a, 103b, or 103c.

A user interacts with the AI system 100 through an application interface (or app) executed on user devices 106 and in an emergency, emergency responder user device 106a of FIG. 1. The RMCC 109 (FIG. 1) melds information from standard map navigation sources with shared user generated information. Information is shared by users of the AI system 100 by sending information to a centralized repository of the RMCC 109 using the application interface on user devices 106 and 106a. The geolocation and networking capabilities of current mobile devices can be used to provide real-time information to the RMCC 109. The AI system 100 can then use the user information to determine locations that may be most likely to have parking spaces available at a certain time based on success rate data shared by users of the AI system 100. The AI system 100 is context aware, meaning it is aware of various factors related to its operation, and able to act upon that awareness. For example, the AI system 100 may be aware of the GPS positioning of the user, the position of the user's destination, and the time, date, and day of the week in which shared locations have been used. When a user or an autonomous vehicle utilizes shared information from RMCC 109 for navigating, the resulting usage data corresponding to that information is captured and saved by the RMCC 109. For instance, the captured data can include whether or not open parking spaces were found at shared locations or how long it took to traverse a certain route, as well as the day and time when those usage instances occurred. All that contextual information can be used by the AI system 100 to determine which location will be most likely to have free parking.

Requests, feedback, and information submitted by user devices 106 and 106a are relayed to the RMCC 109. The RMCC 109 can use a datastore to store and/or retrieve parking and route data shared by users of the AI system 100, as well as data on the context of the usage of that data. In order for the AI system 100 to meld user submitted information with existing navigation information, the RMCC 109 can use the coordinates of parking areas obtained from the data and a combination of user shared routes and routes from one or more map navigation source(s) to determine routing and/or parking information. Context information accumulated when a user navigates with the aid of the AI system 100 may be used to determine which data to provide when the user makes an information request. When a user initiates a request from the user devices 106 and 106a, the application interface can retrieve origin and destination information, as well as the time and date of the request. That information is sent to the RMCC 109, which can use the request information to determine the appropriate response to the request. Operation of the various components of the AI system 100 may be understood by examples of functions offered by the system.

The functionality of the AI system 100 is possible because the RMCC 109 is context aware. Context awareness is the capability of the AI system 100 to be aware of its physical environment or situation and respond proactively and intelligently based on that awareness. The RMCC 109 can be aware of the GPS positioning of the vehicles 103a, 103b, and 103c, and, for example, when any of the vehicles 103a, 103b, or 103c enters an area that has previously been learned, that area's contextual information will be relayed to the processing circuitry or computer inside the vehicle 103a, 103b, or 103c during autonomous driving and to the user during manual driving. When routes are shared, the RMCC 109 will also record the time taken driving the route as well as the time when the route was driven, not only when the route is initially recorded, but also during every subsequent time that custom route is driven. Using that semantic data, the AI system 100 will be able to choose a preferred route during autonomous driving and prioritize suggested routes to give users during manual driving. Similarly, data shared about parking times, pricing, and availability will be used by the system to choose preferred areas to park during autonomous driving and prioritize suggested parking areas to tell users about during manual driving.

The use of shared navigation data makes it possible for erroneous data to be shared either through human error or malicious users. RMCC 109 may mitigate that possible problem by storing the ID of users who share a location. In the event that a user is given erroneous information, the user may report that fact via the application interface on the user devices 106 and in an emergency, device 106a. In order to account for the possibility of users incorrectly marking data as erroneous, RMCC 109 may operate according to a "3 strikes and out" policy. If a piece of submitted navigation information is marked as erroneous 3 times, that data is removed from the datastore. In addition, the user who uploaded that erroneous data may be given their first strike. If a user has been flagged for sharing erroneous data for a predefined number of times (e.g., three), that user may be restricted from sharing information with the RMCC 109.

The AI system 100 also supports an intelligent incident avoidance system (iCAS). An incident can include a collision or other disruption or damage to any of the vehicles 103a, 103b, or 103c. The incident avoidance system is a vehicle-independent system that is used to intelligently determine the difference between humans, animals, and other objects that may be in or that may enter into the path of the vehicles 103a, 103b, or 103c. When an incident cannot be avoided, the system determines what is the "best" to collide with after determining the classification of the living object. The system resolves which collision minimizes, in the order of precedence, the loss of human life, then the loss of animal life, and next damage to the environment.

The collision avoidance system makes use of sensory data from sensors 105a, 105b, and 105c configured respectively in vehicles 103a, 103b, and 103c. In the depicted example, the sensors 105a, 105b, and 105c include cameras, ultrasonic sensors, line following sensors, and thermal sensors to achieve its goals. Other sensors that may be used include, but are not limited to, laser range finders and other distance sensors, Lidar, stereo cameras, audio sensors, gyrometer, infrared sensors, photosensitive sensors, GPS units and tracking systems, etc. After collecting data from the sensors, the collision avoidance system employs artificial intelligence techniques such as fuzzy logic, neural network, and/or convolutional neural networks to determine the difference between human and animals, and then to determine which one to impact or avoid. In various embodiments, the data collected from the vehicle 103a, 103b, and 103c sensors 105a, 105b, and 105c may be sent to the RMCC 109 to be processed by the RMCC 109. In some scenarios, the collision avoidance system can be implemented by processing circuitry of the vehicles 103a, 103b, or 103c (e.g., computer systems, super computers, microcontrollers and/or external memory). In various instances, the collision avoidance system can also be implemented by processing circuitry of the RMCC 109 (e.g., computer systems, super computers, microcontrollers and/or external memory).

Photosensitive sensors may be used primarily for lane detection while thermal sensors can be used to give thermal readings for objects in the vehicle's path including for example pedestrians, animals, ice and standing water. The collision avoidance system may also use ultrasonic sensors, cameras and laser range finders, in their ability to ascertain distance information, for object avoidance. The incident avoidance system is dependent on the vehicle's ability to properly detect objects, road signs, traffic lights and other bodies. As a result, an independent vision system can be used by the vehicles 103a, 103b, and 103c to detect and avoid hazards and incidents involving fixed or mobile animate or inanimate objects. Data from the vision system may be used to collect stereovision quality picture data that can be fed to processing circuitry such as, e.g., a microcontroller for processing. The vision system contains, but is not limited to, stereo cameras, microcontrollers and connective components. Positional data to keep track of the vehicles 103a, 103b, and 103c and the user at various locations is also gathered. GPS units in the vehicles 103a, 103b, and 103c, and user devices 106 and in an emergency, device 106a, may be used to retrieve positional data. In some implementations, radio frequency identification (RFID) readers and RFID tags may be used to increase the accuracy of the positional data that will be received from the GPS unit.

Neural networks have been successfully employed in autonomous vehicle navigation. Neural networks utilize computational methods that have been derived to mimic the brain, through the use of highly interconnected processing elements, which give them learning capabilities and enable them to recognize and understand subtle or complex patterns. A neural network is a mathematical model that resembles a biological network in structure and functionality. It is an adaptive system that allows the network to change its structure based on data transmitted through it during its learning phase. After the network learns during the learning phase, it can then be used to predict future outcomes when fed with relevant data.

Neural networks can be employed by the incident avoidance system to identify human objects based upon, e.g., their different shapes, different body structures, different postures, different poses, different light intensities, different ethnicity, different activities, different movement and/or velocities in the area of the vehicle, and/or different locations in the road. Non-human living objects such as animals may be identified based upon, e.g., their different shapes, different body structures, different colors, different activities, and/or different movement and/or velocities in the area of the vehicle. Combinations of humans and animals may also be identified based upon, e.g., their different shapes, different body structures, different colors, different activities, and/or different movement and/or velocities in the area of the vehicle. Based on the neural network learning the above properties of both animate and inanimate objects in the vicinity of the vehicle, the incident avoidance system can tailor a response to the identification.

Fuzzy logic can also be employed in vehicle control. Fuzzy logic is an artificial intelligence technique that recognizes that a statement is not only evaluated to be true or false but can also be varying degrees of both values. Fuzzy logic can take the vehicle automation a step further by including certain aspects of human intelligence into the design. Fuzzy logic and fuzzy theory can provide a set of rules that may be used to decide which living object classification the object falls into. In addition to classifying objects, fuzzy logic and fuzzy theory may be used, in the event that the information is not complete, to make a decision about which object, if any, should be collided with.

The combination of neural networks and fuzzy logic provides the incident avoidance system with the ability to identify and/or distinguish between human objects, irrespective of human shape or activity, and non-human living objects like animals with a high level of detection accuracy. Based on the living object classification, a determination can be made about which object should be collided with to minimize, firstly, the amount of human loss, secondly the animal life loss and thirdly, environmental damage. In cases where sensory data is incomplete or partial due to limitations of the environment or sensors, fuzzy logic and fuzzy theory techniques can be employed to make the final decision as to whether an impact should be made and with which object.

The AI system 100 also supports a gradual intelligent route learning (GIRL) to allow the AI system 100 to learn driving patterns and/or preferences of the user. For instance, gradual intelligent route learning may learn that the user prefers routes with less stop signs, traffic lights or even pedestrians. It may also realize that the user prefers to drive through particular areas while going to work and go along other routes when returning from work. Frequently travelled paths are learned by the system. This enables the vehicles 103a, 103b, and 103c to be perceptive to the roads the user prefers to use even if they do not take the user on the shortest path to the destination or in the shortest time to the destination. Other driving characteristics of the user may also be learned such as, e.g., how the user accelerates and decelerates, the side of the road preferred when driving in different areas (e.g., if it is a multiple lane highway or a one lane highway), the distance the vehicle is from either edge of the lane, how the user avoided pot holes in the road, the distance between the vehicle and other vehicles around it, speed preferences during different segments of road, and during which times of the day does the user prefer to drive certain routes in comparison to other routes.

The user may configure the gradual intelligent route learning to determine how often a path must be travelled to have the route's driving preferences learned by the AI system 100. For example, a default setting may be three times per week to trigger the gradual intelligent route learning to remember driving preferences for that route. Processing circuitry within the vehicles 103a, 103b, and 103c store travel information and learned user preferences. For instance, the vehicle activity may be tracked using, e.g., GPS tracking, camera imaging, laser range finding, and/or Lidar information over a defined time period (e.g., a week). The activity information may be stored in memory by the processing circuitry (e.g., a computer) and evaluated by the gradual intelligent route learning to determine if a route and/or driving preferences are to be learned. The learned routes and preferences may be sent to the RMCC 109 or DC 116 for storage and use when the RMCC 109 determines recommendations for the user. These routes and preferences may also be used by the vehicles 103a, 103b, and 103c for autonomous operation.

Vehicles 103a, 103b, and 103c also include manual controls to enable manual operation of vehicles 103a, 103b, and 103c in the event, for example, autonomous operation is disabled or unsafe, following an incident, such as an accident.

Figure 2:
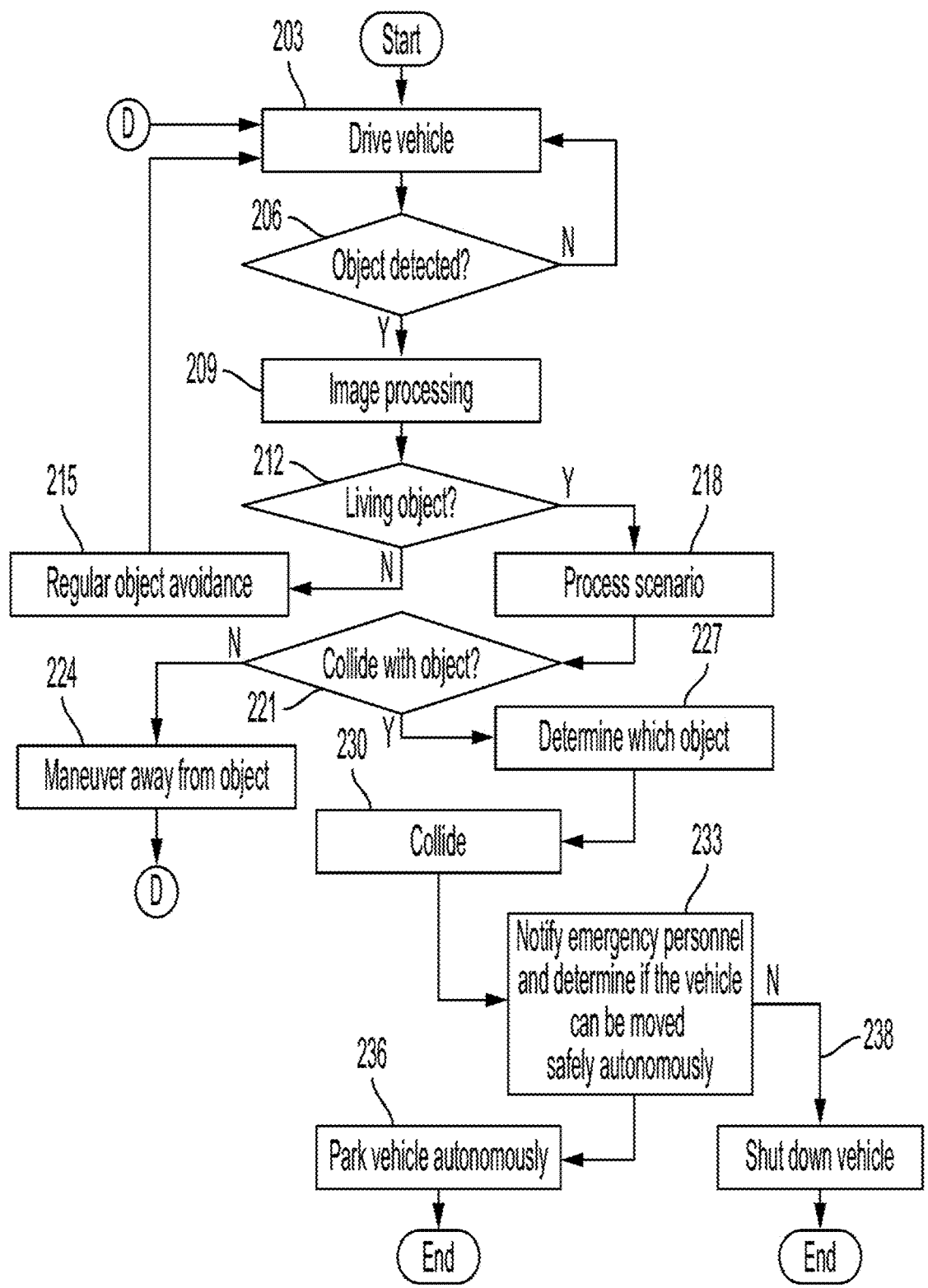
FIG. 2 is a flowchart illustrating an example of an incident avoidance system that can be implemented in the system of FIG. 1 in accordance with various embodiments of the present disclosure.

Referring to FIG. 2, shown is a flowchart illustrating an example of the incident avoidance system that can be implemented in vehicles 103a, 103b, or 103c, and implemented in the RMCC 109, in the AI system 100 (FIG. 1). Beginning with 203, the incident avoidance system is active while the vehicle is autonomously driving. Processing circuitry of the RMCC 109 and the vehicles 103a, 103b, and 103c monitor sensors installed in the vehicles 103a, 103b, and 103c to determine whether an object is detected in 206. If an object is detected in the path of any of the vehicles 103a, 103b, or 103c, or may enter the path of any vehicle 103a, 103b, or 103c, a vision system processes one or more images in 209 to determine if it is a living object. If the detected object is not a living object in 212, then the vehicle 103a, 103b, or 103c can operate with available object avoidance algorithms in 215 before continuing operation in 203.

If it is determined in 212 that a living object has been detected, then the incident avoidance system processes the scenario in 218 to determine if the vehicle 103a, 103b, or 103c should collide with the object. If it is determined in 221 that a collision can be avoided, then in 224 the vehicle 103a, 103b, or 103b that can avoid a collision, is directed to maneuver away from the object before returning to 203. If a collision cannot be avoided in 212, then it is determined in 227 which object is best to collide with in 230. After the collision, the incident avoidance system can initiate a call to emergency services in 233 and determine if the vehicle 103a, 103b, or 103 that collided with the object can be safely moved autonomously from a location where the incident occurred to a second location autonomously, and safely park the vehicle 103a, 103b, or 103c that collided with the object, in 236. In some implementations, the vehicle 103a, 103b, or 103c may be parked in 236 without emergency services being contacted in 233 if no injury has occurred. If the vehicle cannot be safely parked in 238, the vehicle can be shut down until emergency personnel arrive or the vehicle 103a, 103b, or 103c can be safely moved manually by a driver, passenger, or by an emergency responder using emergency responder user device 106a and the methods and systems for handing off automated control of the vehicle 103a, 103b, or 103c, described in FIG. 4.

The AI system 100 also supports an intelligent incident reporting system (iARS). The accident reporting system detects if, while the vehicle is parked or idling or even in motion, an external entity tampered with the body or other portion of vehicle 103a, 103b, or 103c, causing damage to the vehicle 103a, 103b, or 103c (FIG. 1). Using audio and visual sensors, the accident reporting system can record parties involved with the contact and an incident report may be sent to the user or owner informing him or her of possible damage to the vehicle. It also can provide assessments of the number of vehicles, passengers, and pedestrians, animals and objects involved and the nature of the injuries and damages to them.

Sensors of the accident reporting system may remain in a hibernation state until an incident or activity is detected, at which time the sensors are fully turned on. Activities that can activate the accident reporting system include, but are not limited to, other vehicles hitting any of the vehicles 103a, 103b, or 103c, humans and/or animals touching and/or damaging the vehicles 103a, 103b, or 103c, vandalism to the vehicles 103a, 103b, or 103c, theft of any of the vehicles 103a, 103b, or 103c, and/or foreign objects falling on any of the vehicles 103a, 103b, or 103c. Sensors can include, cameras (mono and/or stereo), laser range finders, Lidar, gyrometer, infrared sensors, thermal sensors, etc. Processing circuitry (e.g., a computer or other processing device) in the vehicles 103a, 103b, and 103c may control and monitor the sensors.

When an incident is detected, data is collected from the sensors and the accident reporting system determines what type of activity is happening around the car by assessing the data. The incident reporting system informs the user of the type of activity (e.g., when vehicle is touched, being broken into and/or hit by another car) through the application interface on the user device 106. The user may then view data from the vision, sound and thermal sensors to determine whether to call the authorities, press the panic button for the vehicle 103a, 103b, or 103c, or do nothing, or any combination of those responses. The accident reporting system may be configured to automatically contact authorities about the incident when approved by the user. The user can define which activities they want to be informed about. For instance, a user can configure the accident reporting system to report burglary attempts, foreign object interference with the vehicle, if another car hits the vehicle, or any combination thereof.

When an incident is detected, either by the RMCC 109 or any of the vehicles 103a, 103b, or 103c, the vision system of the involved vehicle 103a, 103b, or 103c is directed to take pictures and/or video recordings of surroundings and the audio system records sounds made around the time of detection or interference. The data collected from detection of the incident can be recorded analyzed and used to generate an incident report. This report is sent to the user via the user device 106. The incident report can contain screen shots and/or video of the incident with probable perpetrators along with any audio that was recorded using an installed microphone during the incident. The incident report also can be sent to an emergency responder user device 106a.

Figure 3:
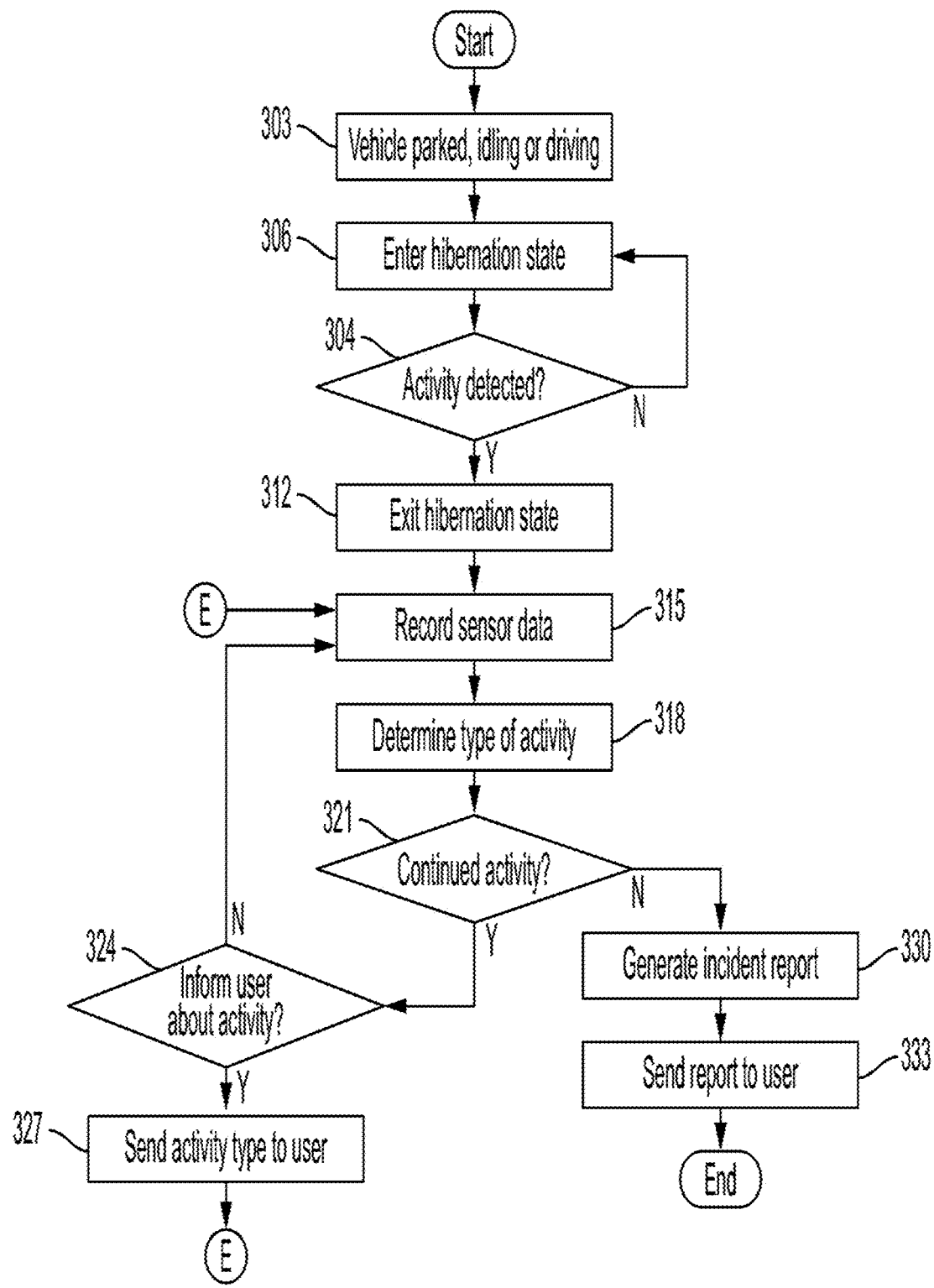
FIG. 3 is a flowchart illustrating an example of an incident reporting system that can be implemented in the AI system of FIG. 1 in accordance with various embodiments of the present disclosure.

Referring to FIG. 3, shown is a flowchart illustrating an example of the accident reporting system that can be implemented in the vehicles 103a, 103b, and 103c, and implemented in the RMCC 109 of the AI system 100 (FIG. 1). Beginning with 303, the incident avoidance system is active while the vehicle is in a parked position, stationary, driving or idling. In 306, the accident reporting system enters a hibernation state or mode to reduce power consumption of the sensors. If an activity or incident is detected in 309, then the accident reporting system exits the hibernation state in 312 and the sensors are fully powered up. For example, the incident avoidance system may detect movement of any of the vehicles 103a, 103b, or 103c or an impulse caused by an impact with any of the vehicles 103a, 103b, or 103c. The incident reporting system then begins recording the sensor data in 315. The sensor data may be recorded for a predefined interval such as, e.g., one minute.

The type of activity is determined by the accident reporting system in 318 based upon the recorded data and other indications from the vehicle systems. For example, the video images may be used to identify whether the accident is caused by an individual, animal, another vehicle, or other object. Characteristics of the movement and/or impact may also be used to determine the type of accident. If the activity continues in 321, the accident reporting system determines if the user wants to be informed about the identified activity type in 324 by viewing the user's predefined preferences. If so, then the reporting system notifies the user of the activity type by sending a notification to the user device 106. The accident reporting system continues recording the sensor data in 315. If the activity has stopped in 321, an incident report is generated in 330, which is sent to the user via the user device 106 in 333 or via email or a privately accessed web application. The format of the incident report may be predefined by the user and may include at least a portion of the recorded sensor data.

Figure 4:
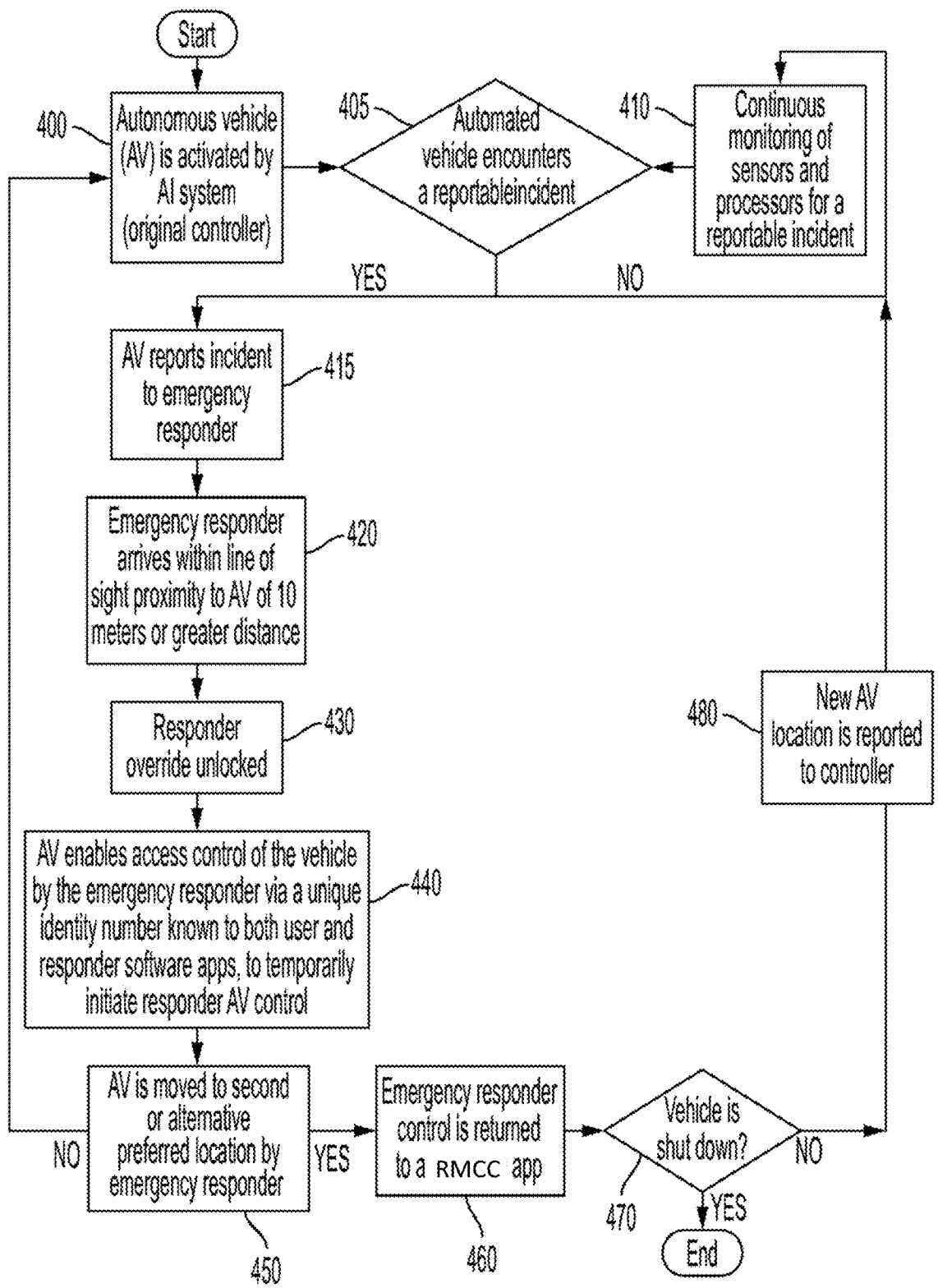
FIG. 4 is a flowchart illustrating an example of a system and method for handoff of control of an autonomous vehicle to an emergency responder or human driver in the event of an incident, that can be implemented in the AI system of FIG. 1.

Referring to FIG. 4, a flowchart illustrating an example of a method for handoff of control of an autonomous vehicle to an emergency responder in the event of an accident or other emergency situation that can be implemented in the AI system of FIG. 1 is provided. The method can be applied, for example, when the AI system determines that an automated vehicle that has been in an incident cannot be safely moved after an accident or emergency situation.

At step 400, AI system 100 activates the vehicle 103a, 103b, or 103c. At step 405, at least one vehicle 103a, 103b, or 103c encounters a reportable incident. The reportable incident could include a collision that is determined to be reportable as described with reference to FIGS. 2 and 3. The reportable incident also could include other emergency situations. At step 405, if a reportable incident is not detected, at step 410, AI system 100 continually monitors sensors for a reportable incident.

At step 415, if a reportable incident is determined, the reportable incident is reported to an emergency responder. The emergency responder could include the police, fire department, towing service, or other trusted emergency responder. At step 420, the emergency responder arrives within a line of sight in a 10 meter or greater proximity to the vehicle 103a, 103b, or 103c involved in the incident, using a mobile user device, such as user device 106a belonging to the emergency responder. At step 430, the emergency responder override in the vehicle 103a, 103b, or 103c involved in the incident is unlocked.

At step 440, AI system 100 enables the emergency responder to access control of the vehicle 103a, 103b, or 103c involved in the incident using a unique identity number known to each of the emergency responder user device 106a, the autonomous vehicle user device 106, and the RMCC 109, using techniques, including handshake techniques. The unique identity number can be stored in the RMCC 109. The unique identity number for the vehicle 103a, 103b, or 103c involved in the incident will be specific to the vehicle 103a, 103b, or 103c. The unique identity number may be encrypted. The unique identity number for the emergency responder device 106a will be specific to an emergency responder and a trusted identity number. The user device 106 and RMCC 109 will be programmed and configured to cede control of the vehicle 103a, 103b, or 103c involved in the incident automatically and without requiring a response from user device 106 when user device 106 receives the trusted unique identity number from emergency responder user device 106a identifying the emergency responder user device 106a as belonging to a trusted emergency responder.

To protect against unauthorized access of control of vehicle 103a, 103b, or 103c by fraudulent emergency responders or hackers, the communication of the unique identity numbers using handshake techniques should preferably be made using encryption techniques and the unique emergency responder identity numbers should be identified and stored as trusted numbers in the RMCC 109.

At step 450, the emergency responder sends the vehicle 103a, 103b, or 103c involved in the incident to an alternative preferred location manually or using user device 106a. At step 450 vehicle 103a, 103b, or 103c is moved from a location where the incident occurred to a second location or an alternative preferred location in an automated or manual manner. The alternative preferred location can be chosen to ensure the vehicle 103a, 103b, or 103c is safely out of the way of oncoming traffic.

At step 460, control of the vehicle 103a, 103b, or 103c involved in the incident can be returned to RMCC 109 and at step 470, the vehicle 103a, 103b, or 103c involved in the incident is shut down but can be restarted if towing is needed after an accident or other emergency has been taken care of.

Unlike prior art methods, this method of transfer of automated control of vehicle 103a, 103b, or 103c involved in the incident does not require or rely upon receiving a response from the owner of the vehicle to transfer control or permit the owner to deny control to the emergency responder.

Figure 5:
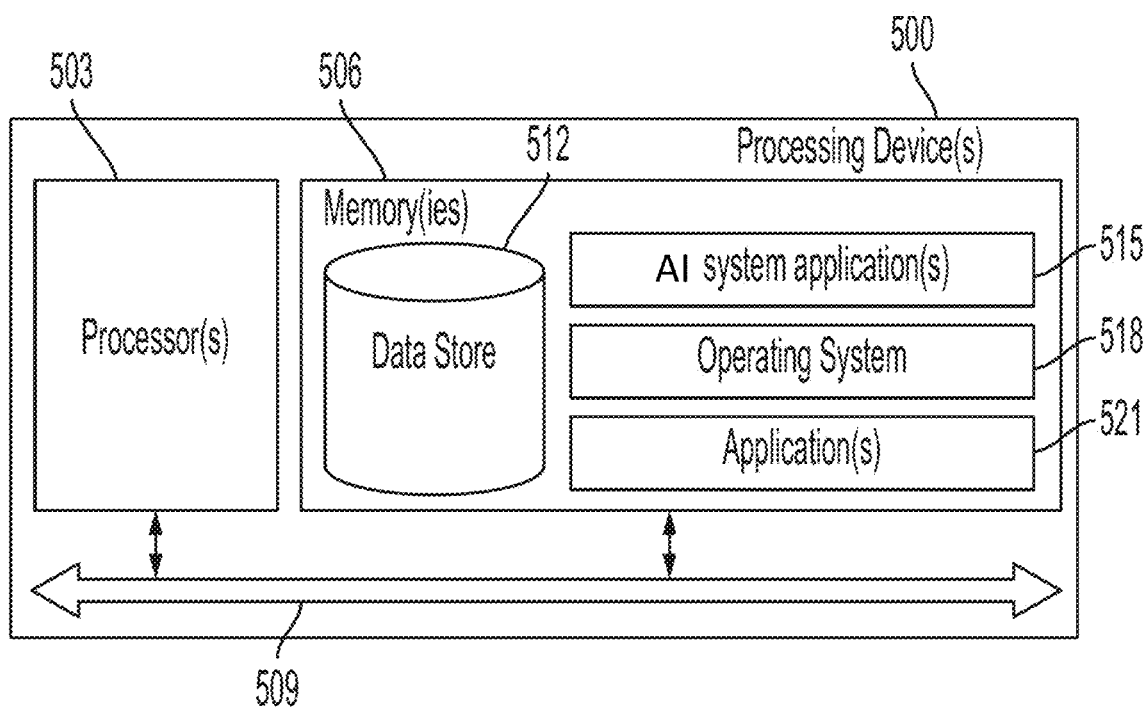
FIG. 5 is a schematic block diagram that provides one example illustration of a processing device employed in the AI system of FIG. 1 in accordance with various embodiments of the present disclosure.

With reference now to FIG. 5, shown is a schematic block diagram of a processing device 500 that may be used to implement various portions of the AI system 100 of FIG. 1 in accordance with various embodiments of the present disclosure. The processing device 500 may include, e.g., a computer and/or microprocessor included in any of the vehicles 103a, 103b, and 103c, the user devices 106 and 106a, and/or a server supporting the RMCC 109 (FIG. 1). The processing device 500 includes at least one processor circuit, for example, having a processor 503, a memory 506, and data store 512, which are coupled to a local interface 509. To this end, the processing device 500 may comprise processing circuitry such as, for example, at least one computer, tablet, smart phone, or like device. The local interface 509 may comprise, for example, a data bus with an accompanying address/control bus or other bus structure as can be appreciated. The processing device 500 can include a display for rendering of generated graphics such as, e.g., a user interface and an input interface such, e.g., a keypad or touch screen to allow for user input. In addition, the processing device 500 can include communication interfaces (not shown) that allow the processing device 500 to communicatively couple with other devices such as, e.g., communication interfaces included in any of the vehicles 103a, 103b, and 103c, a user device 106, emergency responder user device 106a, and/or devices supporting the RMCC 109. The communication interfaces may include one or more wireless connection(s) such as, e.g., Bluetooth or other radio frequency (RF) connection and/or one or more wired connection(s).

Stored in the memory 506 are both data and several components that are executable by the processor 503. In particular, stored in the memory 506 and executable by the processor 503 are AI system application(s) 515, an operating system 518, and/or other applications 521. AI system applications 515 can include applications based on artificial intelligence and machine learning techniques that support autonomous vehicle operation, monitoring, and control, e.g., autonomous passenger retrieval, autonomous parking, intelligent collision avoidance, intelligent accident reporting, gradual intelligent route learning, remote cabin control, simultaneous multiple autonomous vehicle visual sensor fusion, simultaneous multiple autonomous vehicle monitoring, simultaneous multiple autonomous vehicle control, and/or distributed information sharing. It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, Matlab, or other programming languages and their libraries.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the AI system application(s) 515, the operating system 518, application(s) 521, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Figure 6:
FIG. 6 depicts an exemplary pedestrian collision scenario.

FIG. 6 depicts an exemplary pedestrian collision scenario.

Figure 7:
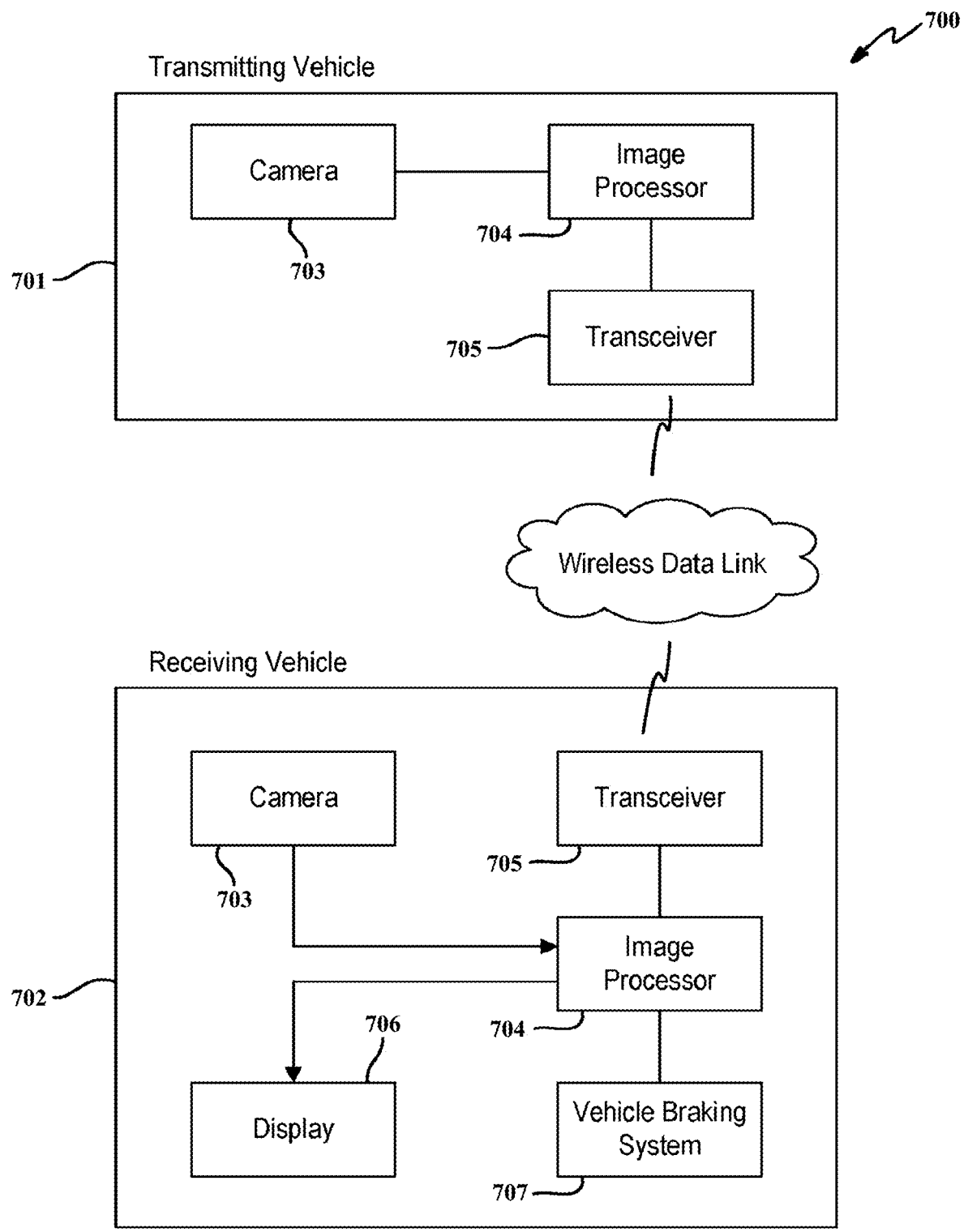
FIG. 7 is a diagram of an exemplary collision avoidance system.

FIG. 7 is a diagram of an exemplary collision avoidance system. In some examples, the exemplary collision avoidance system 700 may be deployed across vehicles. In various embodiments, some or all elements of collision avoidance system 700 may be implemented in the RMCC 109, to collaborate in a distributed manner with one or more collision avoidance system 700 component configured in one or more autonomous vehicle. In the depicted example, the collision avoidance system 700 is operational between a transmitting vehicle 701 and a receiving vehicle 702. Each vehicle 701, 702 is equipped with an imaging device 703, an image processor 704, and a transceiver 705. The vehicles may also be equipped with other conventional vehicle subsystems, including but not limited to a vehicle navigation system with a display 706 as well as an automatic emergency braking system 707, such as the Pedestrian Collision Avoidance System (PCAS). More or less vehicles may be equipped in a similar manner and comprise part of the system. In some embodiments, designated infrastructure-locations, such as, for example, signs, traffic signals, bridges, and the like, in addition to the RMCC 109, can also be equipped in a similar manner and include part or all of the collision avoidance system 700.

In the example embodiment, the imaging device 703 is a camera integrated into a vehicle. The system can be extended to employ any sensor modality including Lidars, radars, ultrasonic sensors, etc. A more powerful system can be realized by the fusion of a multimodal-sensor system such as any combination of cameras, Lidars, radars, and/or ultrasonic sensors. In cases of sensor modalities that generate a large amount of data, the need for data compression could become necessary. Hence, in the case of using visual sensors, video compression/decompression will be critical for achieving efficient communication among the vehicles and/or infrastructure. Any state-of-the-art video coding standards or technology that is either standalone or built-in within popular cameras can be used.

In an example embodiment, the image processor 704 is a Nvidia Drive PX 2 processor. It should be understood that the logic for the control of image processor 704 can be implemented in hardware logic, software logic, or a combination of hardware and software logic. In this regard, image processor 704 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that image processor 704 performs a function or is configured to perform a function, it should be understood that image processor 704 is configured to do so with appropriate logic (such as in software, logic devices, or a combination thereof).

In the example embodiment, the wireless network between vehicles is based on underlying DSRC transceivers 705 that adhere to the Intelligent Transportation System of America (ITSA) and 802.11p WAVE standards, and which are certified by the US DOT. By default, DSRC equipment periodically sends Basic Safety Messages (BSM). The messages contain vehicle status and applications information. DSRC is merely illustrative of how a wireless data link may be established between vehicles and other communication protocols fall within the broader scope of this disclosure.

Figure 8:
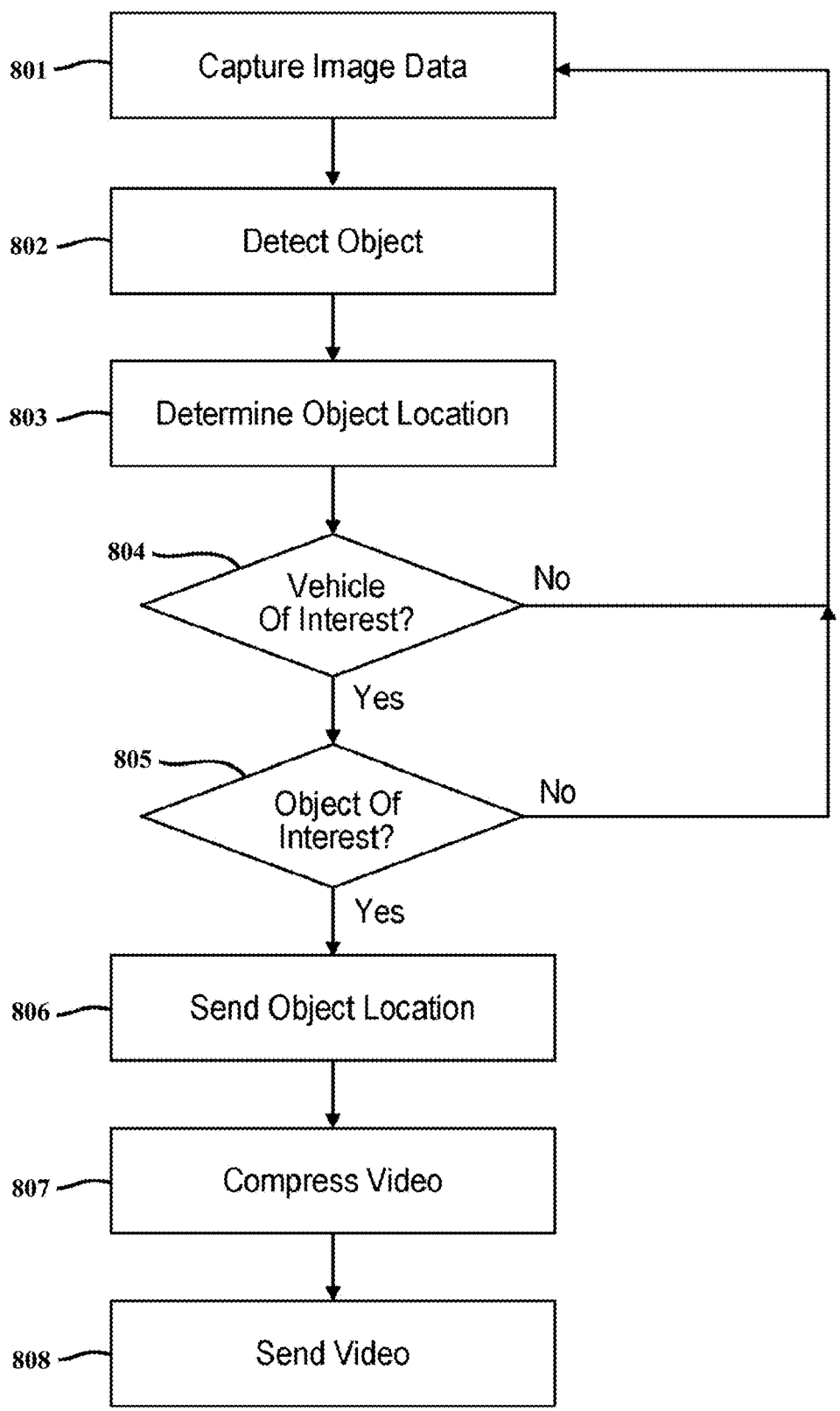
FIG. 8 is a flowchart illustrating an example process for sharing data by a transmitting vehicle.

FIG. 8 is a flowchart illustrating an example process for sharing data by a transmitting vehicle. Image data is captured at 801 using an imaging device in the transmitting vehicle. Image data may be captured continuously, periodically or in response to a trigger signal. In the example embodiment, the imaging device is a camera although other types of imaging devices are contemplated by this disclosure.

Image data is then analyzed at 802 to detect and/or identify objects of interest, such as a pedestrian, another vehicle or other potential hazards. In an example embodiment, objects are detected using a You Only Look Once (YOLO) object detection algorithm. For further details regarding YOLO object detection, reference may be had to "YOYL09000: Better, Faster, Stronger' ArXiv:1612.08242 December 2016 which is herein incorporated by reference. It is readily understood that other object detection methods also fall within the scope of this disclosure.

Next, a determination is made regarding whether to share data about the detected object with other vehicles. In this regard, the location of the object is determined at 803 from the image data. This first location of the object is defined with respect to the location of the transmitting vehicle. That is, the transmitting vehicle serves as the reference frame for this first location. Techniques for determining a distance to an object from the imaging data are readily known in the art. For example, when a vehicle detects a pedestrian crossing, it estimates the pedestrian distance I as follows:

$$l = f_c \frac{R_h}{I_h} \quad (1)$$

where fc is the focal length and $R_h$ and $I_h$ are the real pedestrian height in meters and height in image pixels, respectively.

Two different criteria are applied before sharing object information, including its location, with nearby vehicles. First, a criterion may be applied to determine whether a nearby vehicle is a vehicle of interest (i.e., a vehicle to which the object information is to be sent to) as indicated at 804. An example criterion is that object information should only be sent to vehicles located next to or behind the transmitting vehicle. Vehicles in front of the transmitting vehicle are not of interest and will not be sent object information. Other example criteria are that vehicles of interest should be traveling in the same direction as the transmitting vehicle and/or should be no more than two lanes away from the transmitting vehicle. Other types of vehicle criteria are contemplated by this disclosure.

Second, a criterion is applied to determine whether the object is of interest to the recipient vehicle as indicated as 805. For example, only objects within a predefined distance (e.g., I<50 meters) from the transmitting vehicle are deemed to be objects of interest. Objects falling outside of the predefined distance are not of interest and information about these objects will not be shared with other vehicles. Likewise, other types of object criteria are contemplated by this disclosure.

For each vehicle of interest, object information is sent at 806 via a wireless data link from the transmitting vehicle to the vehicle of interest (i.e., receiving vehicle). In an example embodiment, the wireless network is based on underlying DSRC transceivers that adhere to Intelligent Transportation System of America (ITSA) and 802.11p WAVE standards. In this case, object information is transmitted periodically using Basic Safety Messages (BSM) over the DSRC link. Again, it is only necessary to send information for objects of interest.

Furthermore, image data for an object of interest (e.g., video segment) is sent to the vehicle of interest. To do so, the transmitting vehicle establishes another secondary data connection between the transmitting vehicle and the receiving vehicle. In one example, the transmitting vehicle may establish a TCP connection with the vehicle of interest. Rather than sending all of the captured image data, the transmitting vehicle can send only data corresponding to the object of interest. For example, the transmitting vehicle sends the image data contained in a boundary box that frames the object as designated by the object detection algorithm. Prior to sending the image data, the image data is preferably compressed as indicated at 807. For example, the image data can be compressed using a compression algorithm, such as Motion JPEG. Different types of compression methods fall within the broader aspects of this disclosure. In any case, the image data for the object is sent at 808 by the transmitting vehicle to the receiving vehicle. It is to be understood that only the relevant steps of the processing by the image processor 704 are discussed in relation to FIG. 8, but that other software-implemented instructions may be needed to control and manage the overall operation of the system.

Figure 9:
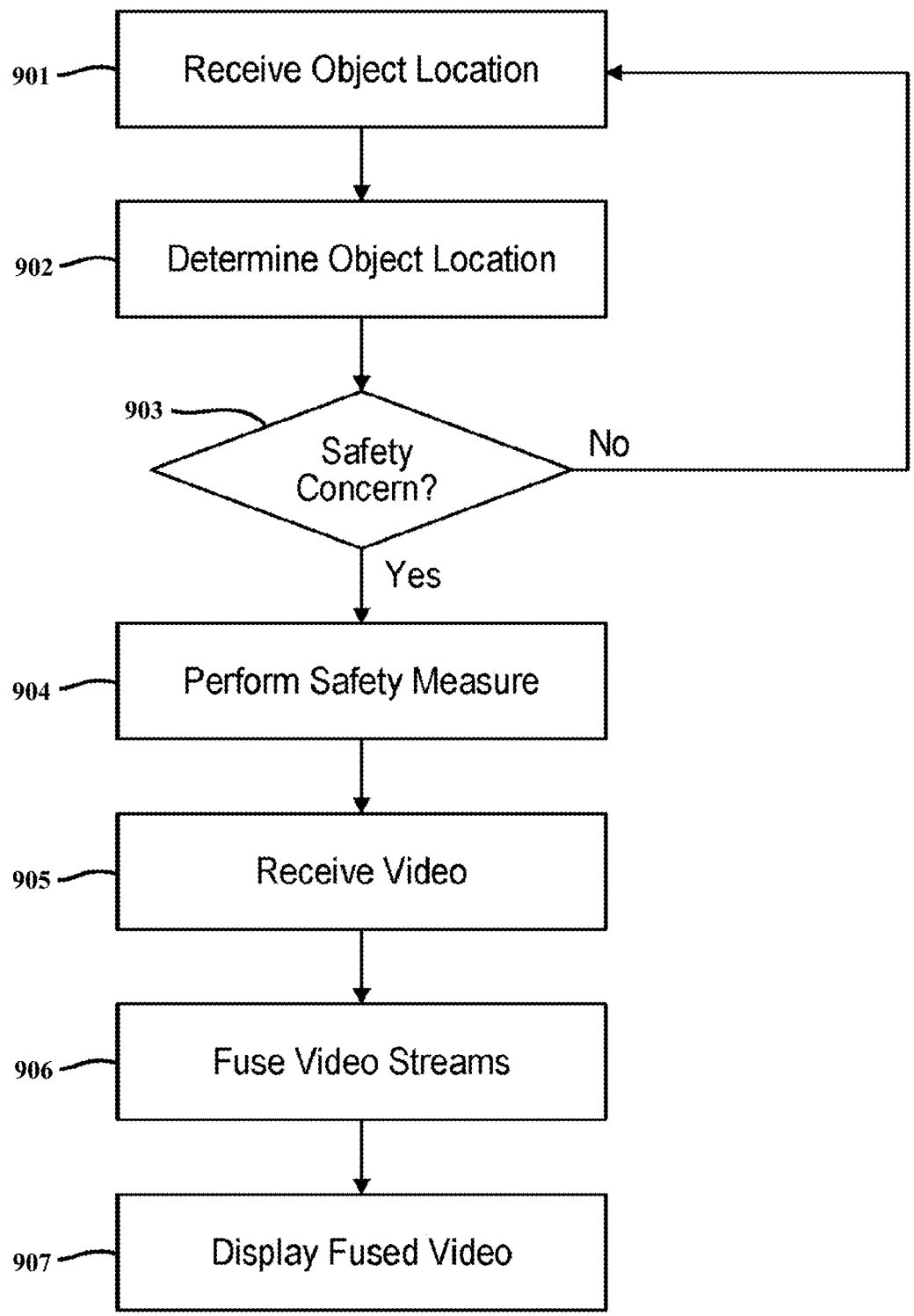
FIG. 9 is a flowchart illustrating an example process for fusing data by a receiving vehicle.

FIG. 9 is a flowchart illustrating an example process for fusing data by a receiving vehicle. Table 1 defines the variables that are used in system parameter calculations set forth below.

TABLE 1

| | |
|---|---|
| A | Vehicle A |
| B | Vehicle B |
| C | Pedestrian |
| D | Expected collision point |
| w | Vehicle width |
| d | Vertical distance between vehicle A and B (similar to ΔZ) |
| l | Distance between vehicle B and pedestrian |
| e | Horizontal distance between vehicle A and B (similar to ΔX) |
| r | Horizontal distance between pedestrian and vehicle B |
| α | Angle between vehicle A and pedestrian |
| β | Angle between vehicle B and pedestrian |
| n | Euclidian distance between vehicle A and pedestrian |
| k | Euclidian distance between vehicle B and pedestrian |
| ΔY | Difference between camera A and camera B altitude |

The reported locations could be measured in any distance units. For example, they could be in meters as used in the Universal Transverse Mercator (UTM) coordinate format. Also, the camera location is considered as a vehicle reference location. If more than one pedestrian is detected, the same calculations can be performed for each pedestrian. Meanwhile, it is possible to combine two pedestrians, who are adjacent or in close proximity, as one pedestrian. Here, and for illustrative purposes only, the focus is on a single pedestrian crossing. Each vehicle has a Vehicle of Interest (VoI) list that includes all vehicles that may share useful information to the ego-vehicle.

Object information is received at 901 by the receiving vehicle. Object information received by the receiving vehicle may include a distance between the two vehicles. For example, the exchanged information may include a vertical distance and a horizontal distance between the vehicles. In this way, the receiving vehicle is able to determine the location of the transmitting vehicle in relation to itself. As noted above, this information may be periodically exchanged using messages sent over a DSRC link. Other types of wireless links could also be used by the vehicles.

Next, the location of the object is determined at 902 by the receiving vehicle. This location of the object is defined with respect to the location of the receiving vehicle. That is, the receiving vehicle serves as the reference frame for this second location of the object. In the example embodiment, this second location is derived using the first location of the object sent by the transmitting vehicle and the distance between the two vehicles as will be further described below.

Figure 10:
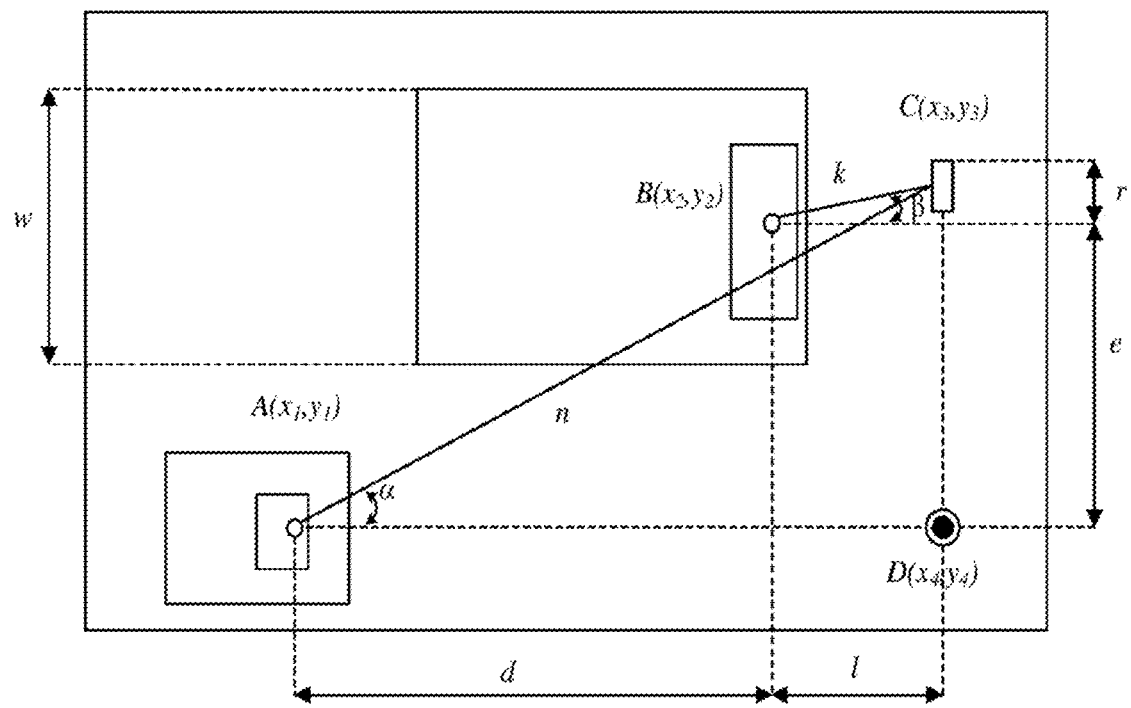
FIG. 10 is a schematic of an example collision scenario.

From the location of the object, a safety concern can be evaluated at 903 by the receiving vehicle. In one embodiment, the receiving vehicle computes an expected collision point, D, between the object and the receiving vehicle as seen in FIG. 10. The receiving vehicle can also compute a distance to collision (DTC) and/or a time to collision (TTC) as follows:

$$DTC = l + d \quad (2)$$

$$TTC = \frac{DTC}{S_A} \quad (3)$$

where $S_A$ is the speed of vehicle A (e.g., in meters per second). These metrics are merely exemplary.

Based on the second location of the object, a safety measure can be implemented in the receiving vehicle as indicated at 904. For example, assuming an expected collision point exists, a safety concern can be raised and a warning can be issued to the driver of the receiving vehicle. The warning can be issued at a fixed interval (e.g., 5 seconds) before an anticipated collision. The warning may a visual, audible and/or haptic indicator. In response to a raised safety issue, the receiving vehicle may also implement an automated preventive measure, such as automatic braking of the vehicle.

Additionally, video for the detected object is received at 905 by the receiving vehicle. The received video can then be fused at 906 with the video captured by the receiving vehicle. At 907 the fused video is displayed. Continuing with the example in FIG. 10, the image of the obscured pedestrian can be integrated into the video captured by the receiving vehicle. One technique for fusing the data is set forth below.

FIG. 10 is a schematic of an example collision scenario. After vehicle B receives a request for video streaming, vehicle B shares only the detected pedestrian region of the image, also called Region of Interest (RoI). Before sending the RoI to vehicle A, the RoI is compressed into a video stream. When the vehicle receives the first image of the video stream, it has to determine if it is within the local camera Horizontal Field Of Viewing (HFOV). Hence, angle ∠a is calculated as shown in FIG. 10.

$$\angle\alpha = \arctan\left(\frac{r+e}{d+l}\right) \quad (4)$$

where $$r = \tan(\beta) * l \quad (5)$$

Note that r might be negative if ∠β is negative. ∠β is estimated by vehicle B. A simple way to estimate an object's horizontal angle is by measuring the average horizontal object pixels' locations to the camera Horizontal Field of View (HFOV) as follows:

$$\angle\beta = \frac{HFOV}{2} - \left(\frac{u}{u_{max}} * HFOV\right) \quad (6)$$

When ∠β is positive, the object is on the left side of the camera and vice versa. Now if La is larger than HFOV of vehicle A, only audible warning is made to the driver. Otherwise the pedestrian image is transposed on the local video stream image.

Figure 11:
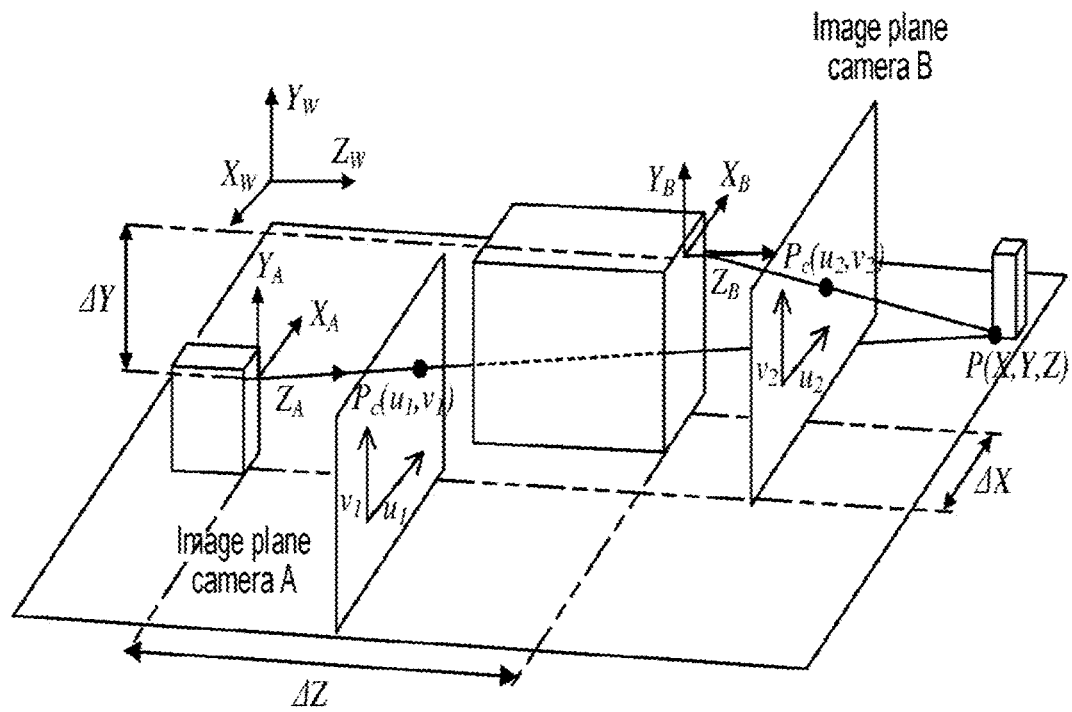
FIG. 11 is a diagram depicting exemplary pin hole model and image transpose calculations.

FIG. 11 is a diagram depicting exemplary pin hole model and image transpose calculations. As shown in FIG. 11, using the camera pinhole model, the object is transferred from camera B image plane to camera A image plane as follows:

$$u_1 = \frac{fc_x(X + \Delta X)}{Z + \Delta Z} \quad (7)$$

$$v_1 = \frac{fc_y(Y + \Delta Y)}{Z + \Delta Z}$$

ΔX, ΔY and ΔZ are the differences in coordinate between the two cameras' locations which are similar to variables shown in FIGS. 10-11. Both variables X and Y are estimated from camera B using:

$$X = \frac{Z * u_2}{fc_x} \quad (8)$$

$$Y = \frac{Z * v_2}{fc_y}$$

After imposing the detected object on the camera A image, the fused image is presented to the driver at 907 on a display. The process is repeated until vehicle B stops sharing detected object information. To avoid sharing unnecessary information, vehicle B stops sharing detected object information when the object is no longer in front of the vehicle and visible to other vehicles $$\left(\text{i.e. } r > \frac{w}{2}\right).$$

It is important to note that information from shared sensors might be updated at different rates. As a result, time (clock) synchronization between vehicles, across vehicles, and between vehicles and an embodiment RMCC, is necessary. It is to be understood that only the relevant steps of the processing by the image processor 704 are discussed in relation to implementation of the example depicted by FIGS. 10-11, and that other software-implemented instructions may be needed to control and manage the overall operation of the system.

Experimental setup and results are now described for the example embodiment of the collision avoidance system 700. The experimental setup consists of two vehicles (e.g., SUV and Sedan). In each vehicle, a Cohda (MK5 DSRC transceiver, Global Navigation Satellite System GNSS) and a dashboard camera (DashCam) is installed. Although DSRC transceivers are equipped with GNSS, this embodiment opted to use a separate Real-Time Kinematic (RTK) GNSS because RTKGNSS offers high-accuracy location estimates when compared to standalone GNSS that is used in DSRC transceivers. In these experiments, an Emlid Reach RTK GNSS receiver is used, which is a low-cost off-the-shelf device. To store the collected data, all sensors on each vehicle are connected to a laptop that has Robotic Operation System (ROS) installed on it. Two vehicles' laptops are connected via DSRC transceivers during the data collection to synchronize laptop clocks. In addition, a bandwidth test experiment was conducted between two vehicles to verify the available bandwidth and to emulate channel performance when conducting the experiment in the lab.

The RTK-GNSS output was set to the maximum limit of 5 Hz and the camera to 24 Frame Per second (FPS). The DSRC data rate channel was set to 6 Mbps. The experiment was conducted on the Michigan State University campus and surrounding areas with wide ranging speed limits up to 55 kilometer-per-hour (kph). All of the experiments were conducted during daytime. In the first part, channel bandwidth test was collected while driving at a speed ranging between 0 and 55 kph; and the distance between the two vehicles' DSRC transceivers ranged from 5 to 100 meters. In the second part, a pedestrian pre-collision scenario was simulated and coordinated by a test team.

In the lab setup, two ROS supported desktop PC were used and connected with stationary DSRC transceivers. The distance between the two transceivers is fixed to 5 meters. To emulate the moving vehicle, based on the road test findings, a random delay of 5 to 15 milliseconds delay was added to the channel and the maximum channel bandwidth set to 1.8 Mbps. Both PCs have core 17 processor and one PC with NVIDIA GTX 1080ti GPU. The GPU capable PC represents vehicle B while the other PC represents vehicle A. Proposed system components were implemented as ROS nodes. You Only Look Once (YOLO) object detection algorithm was used in the lab experiment, such that the algorithm for pedestrian detection was trained using Visual Object Classes (VOC) data set. Also, Motion JPEG (MJPEG) was used as the video/image encoding/decoding technique.

Figure 12:
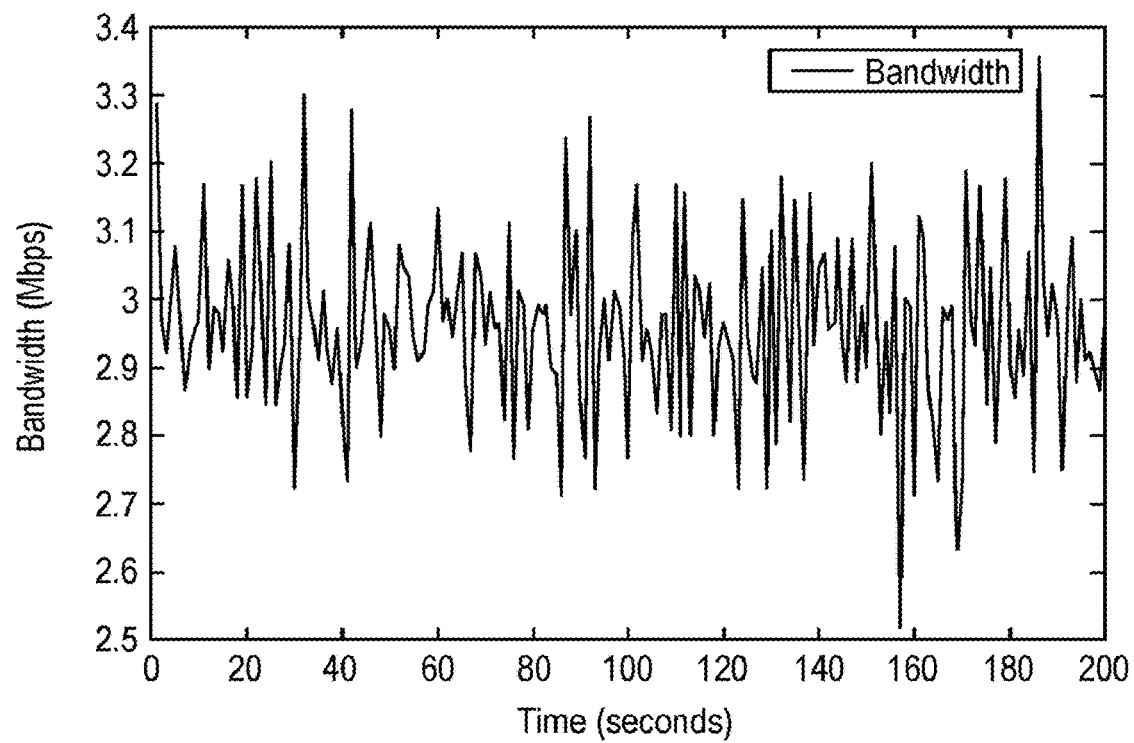
FIG. 12 is a graph illustrating exemplary bandwidth between two DSRC units.
Figure 13:
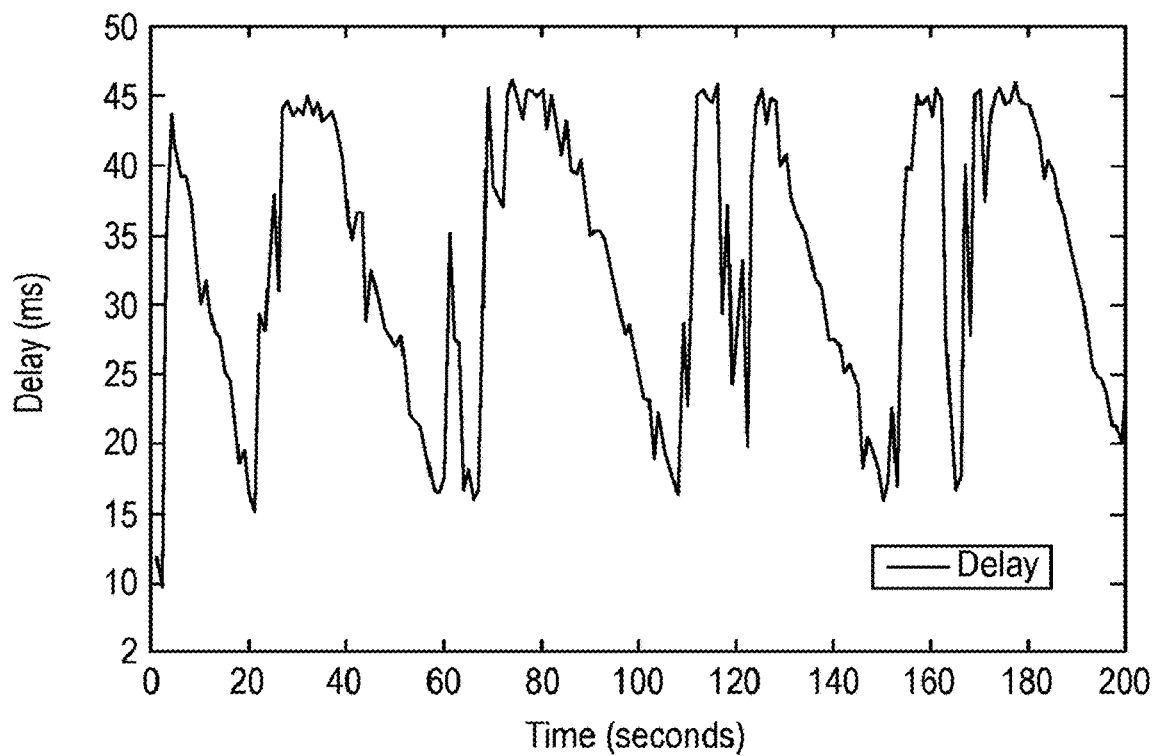
FIG. 13 is a graph illustrating exemplary packet delay between two DSRC units.

FIGS. 12 and 13 depict an exemplary sample of DSRC bandwidth and packet delay test results, respectively. During the test producing these sample results, the distance between the two vehicles was 90 to 120 meters and at a speed of 55 kph. The average bandwidth and delay were 2.85 Mbps and 34.5 ms respectively. It was found that DSRC equipment can carry a high quality video stream with minimal delay. Similar findings are found in P. Gomes et al., "Making Vehicles" Transparent Through V2V Video Streaming" IEEE Transactions on Intelligent Transportation Systems 13 (2012).

Object detection algorithm YOLO was able to process 8-10 FPS which is considered acceptable. However, it is possible to achieve higher processing using automotive oriented hardware. As discussed earlier, after a pedestrian is detected, the pedestrian distance and angle is estimated. The Region of Interest (ROI) is extracted from the original image and sent to the video/image encoder. The M-JPEG encoder compresses each image individually as a JPEG image. This compression method saves a significant amount of time compared to other advanced video compression techniques. The average compressed image size is 3.5 KB which is much smaller than sharing the full image. For example, a high quality H.264 video stream of 640×480 at 10 FPS requires 1.029 Mbps, while selective sharing at 10 FPS would need only 280 Kbps. However, some embodiments may limit the video streaming rate to 5 Hz, similar to GNSS update rate to achieve best accuracy. Pedestrian distance l and ∠β are sent at the detection rate which is 8 to 10 Hz.

Figure 14:
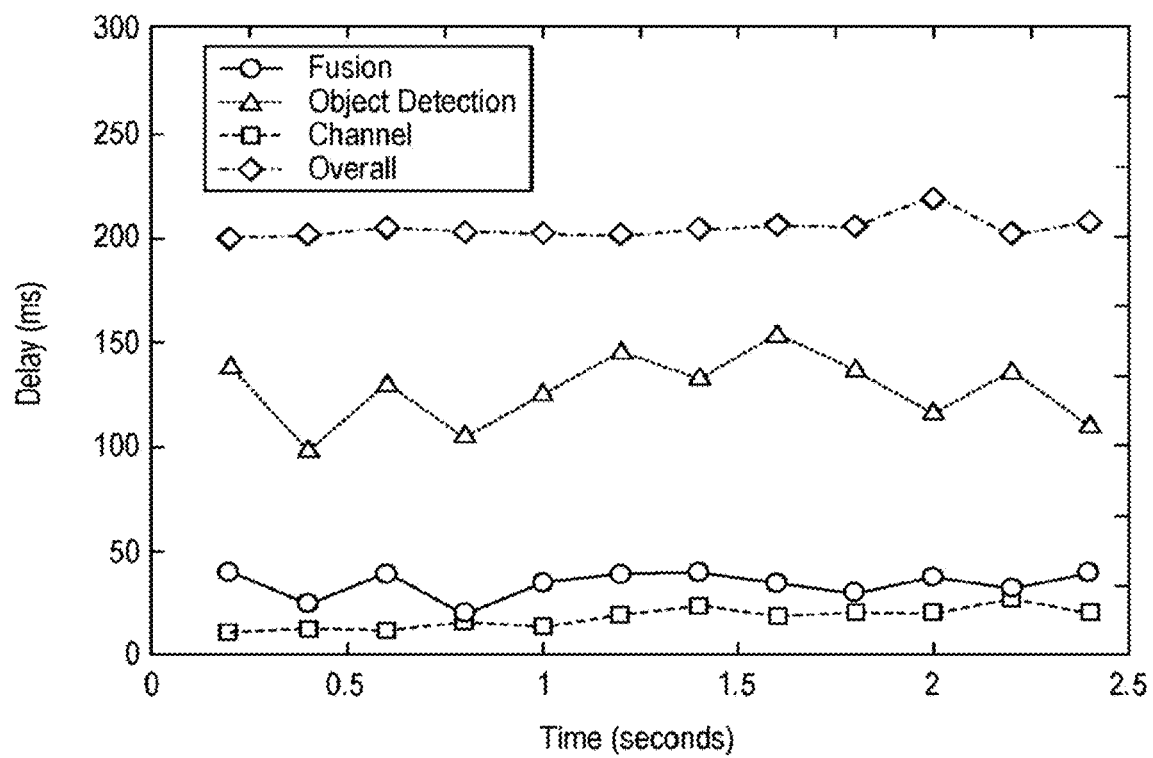
FIG. 14 is a graph illustrating exemplary delay in the proposed collision avoidance system.
Figure 15A:
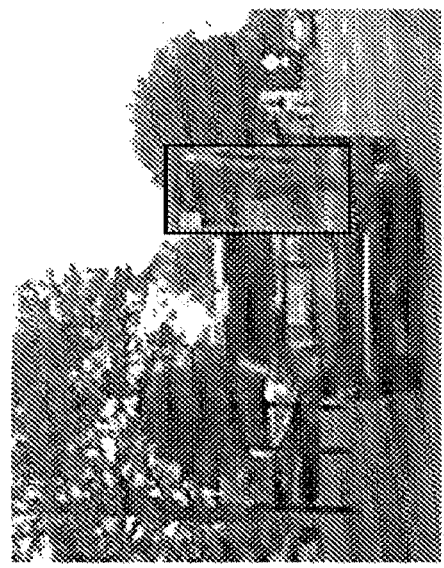
FIGS. 15A-15F together depict example fused images shown to the driver of the collision avoidance system.
Figure 15B:
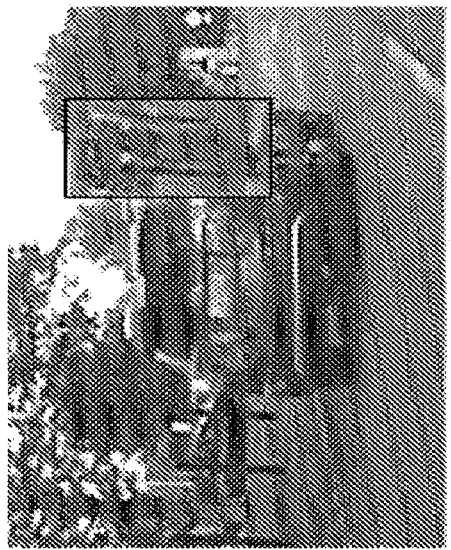
Figure 15C:
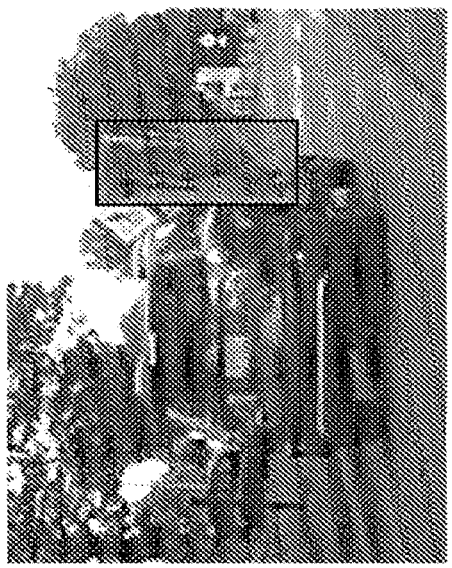
Figure 15D:
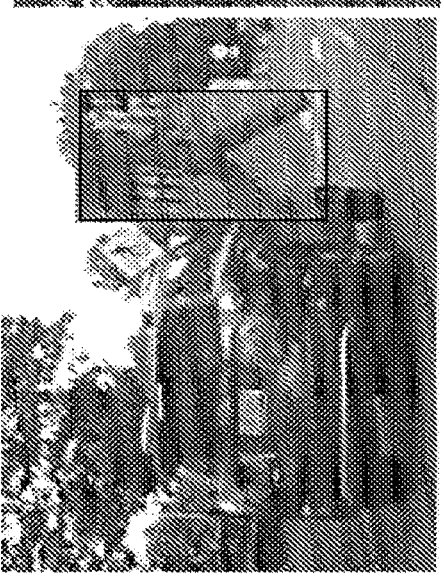
Figure 15E:
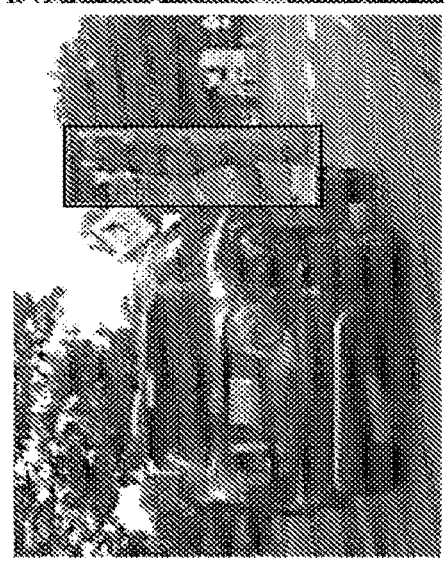
Figure 15F:
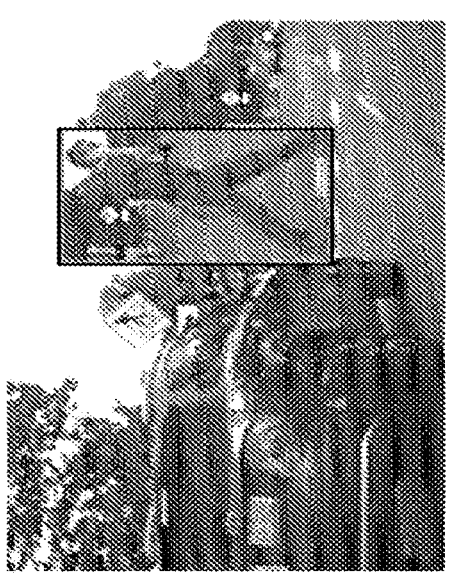

FIG. 14 depicts the delay at every step of operation, where overall delay is between two consecutive image fusions including the display of the final fused image. The average overall delay is 200 ms which is similar to the video sharing rate of 5 Hz, mainly due to the fact that the GNSS update is limited to 5 Hz. The fusion processes delay average is 33 ms, and includes the delay caused by calculation, fusion and synchronization between remote and local data. Meanwhile the average channel object detection delays are 10 ms and 122 ms respectively. It is clear that the sum of the fusion, channel and object detection is less than overall delay, suggesting the 200 ms delay is not possible to increase the information sharing rate by a) improving object detection processing rate without decreasing detection accuracy b) increasing GNSS rate.

TABLE 2

| Time (seconds) | Speed (m/s) | DTC (m) | TTC (seconds) |
| --- | --- | --- | --- |
| 0 | 8.98 | 20.1 | 2.25 |
| 0.2 | 8.94 | 19.1 | 2.18 |
| 0.4 | 8.65 | 17.99 | 2 |
| 0.6 | 8.64 | 16.5 | 1.9 |
| 0.8 | 8.49 | 15.62 | 1.8 |
| 1 | 8.31 | 14.4 | 161 |
| 1.2 | 7.77 | 12.79 | 1.53 |
| 1.4 | 7.64 | 11.5 | 1.47 |
| 1.6 | 7.64 | 10.8 | 1.42 |
| 18 | 7.10 | 10.1 | 141 |
| 2 | 6.52 | 9.4 | 1.43 |
| 2.2 | 6.13 | 9.1 | 1.4 |
| 2.4 | 5.94 | 8.3 | 1.9 |

Table 2 shows the calculations that are conducted during our pre-collision interaction which lasted 2.4 seconds. During that interaction, the driver is warned about pedestrian crossing. A sample of the fused images is shown in FIGS. 15A-15F.

Figure 16:
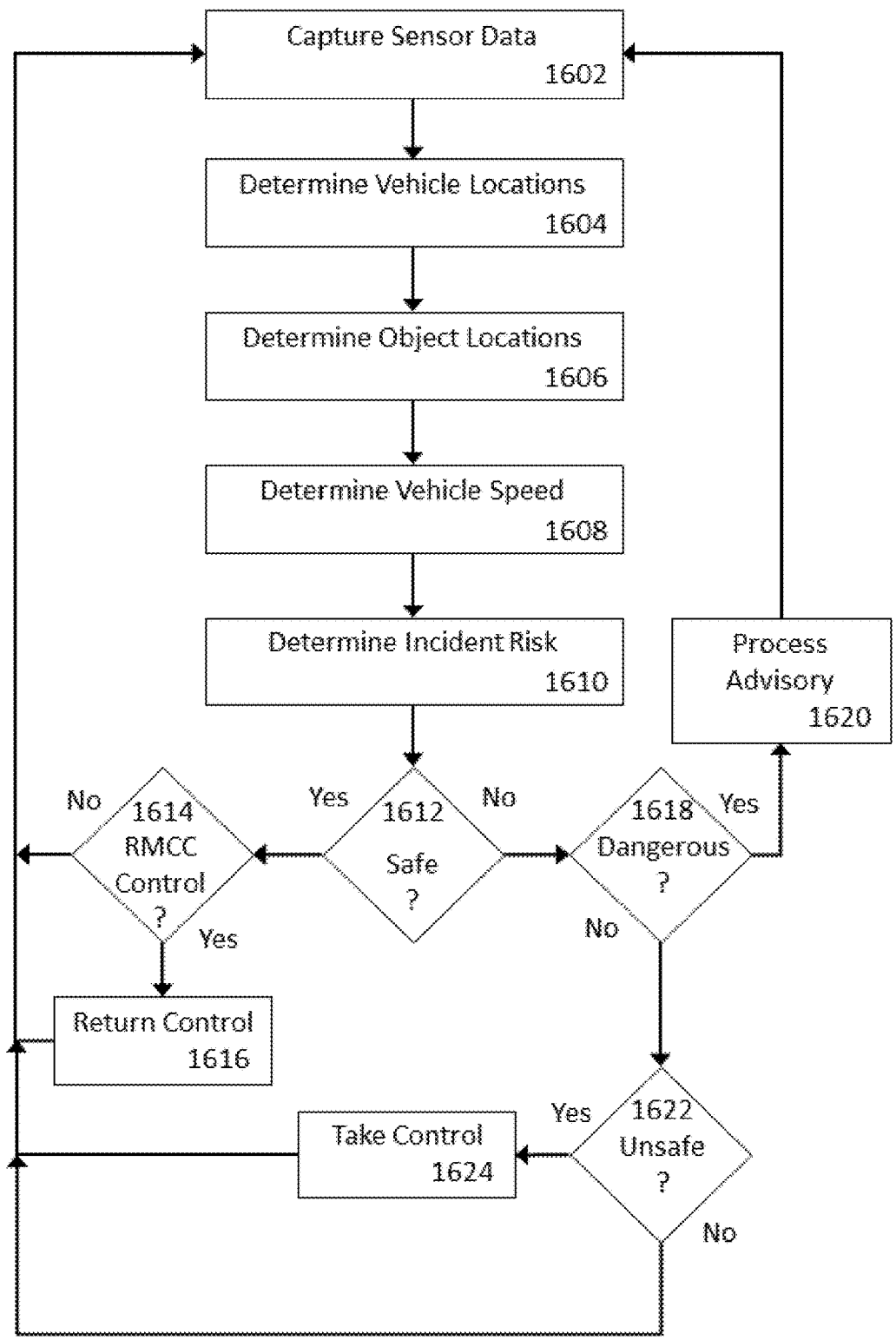
FIG. 16 is a flowchart illustrating an example process for supervising multiple autonomous vehicles and monitoring incident risk by an exemplary RMCC.

FIG. 16 is a flowchart illustrating an example process for supervising multiple autonomous vehicles and monitoring incident risk by an exemplary RMCC. In various examples, the process depicted by FIG. 16 may be implemented in vehicles 103a, 103b, or 103c, and implemented in the RMCC 109, in the AI system 100 (FIG. 1). The exemplary remote monitoring and control (RMCC) process depicted by FIG. 16 is given from the perspective of the processor 503 (FIG. 5). The illustrated process begins at step 1602 with the processor 503 capturing sensor data from multiple autonomous vehicles. In various examples, the sensors may be distributed across multiple vehicles. In some embodiments, fused sensor data may be compressed before the sensor data is sent by the vehicles to the RMCC. In an illustrative example, the vehicles and the RMCC may employ techniques from the data communication and networking field to limit the amount of sensor data transmitted from the vehicles to the RMCC. For example, one or more vehicle may be configured with artificial intelligence to eliminate redundant sensor data from the sensor data stream sent to the RMCC. In such an example, the vehicle may send sensor data updates at periodic intervals, or when key sensors change values.

In an example illustrative of various embodiment implementations' design and usage, the RMCC may be configured to simultaneously monitor and control multiple vehicles, based on sensor data received by the RMCC from the multiple vehicles. In some examples, the RMCC may determine an independent incident risk level for each vehicle of the multiple vehicles operating under the governance of the RMCC. An embodiment RMCC may assume full or partial control of one or more of the multiple vehicles determined by the RMCC to be operating at an incident risk level that is not safe. In some embodiments, the RMCC may assume full or partial control of one or more vehicle for which the RMCC determined an incident risk that is not safe, to restore a safe incident risk based on implementing one or more safety measure or advisory recommendation in the vehicle having the incident risk level that is not safe.

In an illustrative example, the RMCC is configured to characterize the incident risk determined for each vehicle as being in at least three ranges: safe, dangerous, and unsafe.

In illustrative examples of monitored autonomous vehicles operating at a safe incident risk level, the RMCC will continue simultaneous monitoring of the individual autonomous vehicles based on determining the incident risk individually for each of the vehicles, taking control of the vehicles if the incident risk changes to unsafe, and returning control to the vehicles when the safe incident risk is restored. A scenario characterized by the RMCC as safe may be referred to as a normal condition, and may be displayed or indicated as a 'green' condition to one or more user.

In various examples of monitored autonomous vehicles operating at a dangerous incident risk level, the RMCC may issue an advisory action or send an advisory recommendation to one or more vehicle for which the RMCC determined the incident risk is dangerous, to warn the vehicle of the dangerous incident risk. In an illustrative example, a dangerous incident risk may present an increased risk where caution is advised, or partial control may be implemented. A scenario characterized by the RMCC as dangerous may be referred to as a caution, or advisory condition, and may be displayed or indicated as a 'yellow' condition to one or more user. Actions taken by the RMCC in response to a dangerous incident risk for one or more vehicle may include simultaneously taking partial control of one or more vehicle (for example, limiting speed), increasing sensitivity to events that would elevate the level of control to full control (such as, for example, the vehicle crossing the center line or the road shoulder), sending a message to the vehicle controller to warn the vehicle to adapt to the dangerous incident risk, or present an object of interest to the vehicle controller or occupant (for example an image of a pedestrian preparing to cross in the vehicle's path).

In some examples of monitored autonomous vehicles operating at an unsafe incident risk level, the RMCC may implement a safety measure simultaneously in one or more vehicle for which the RMCC determined the incident risk is unsafe, to reduce the incident risk level for the one or more vehicle that was operating at an unsafe incident risk. An unsafe incident risk presents significant and imminent danger of vehicle occupant loss of life or injury. In an illustrative example, a scenario characterized by the RMCC as unsafe may be displayed or indicated as a 'red' condition to one or more user. Actions taken by the RMCC in response to an unsafe incident risk for one or more vehicle may include reducing the speed of one or more vehicle to increase separation between vehicles, steering one or more vehicle to avoid collision, or automatically braking one or more vehicle to avoid collision.

In some embodiments, the RMCC may receive, process, and act upon, sensor data from one or more autonomous vehicle that is not operating under the governance of the RMCC. In an illustrative example, a vehicle operating under the governance of the RMCC may send sensor data to the RMCC, however such a vehicle that is not under the governance of the RMCC may not be capable of accepting control by the RMCC. For example, a vehicle that is under the governance of the RMCC may be advised or controlled to reduce incident risk based on the operational behavior of another vehicle that is not under the governance of the RMCC.

In some embodiments, an incident risk margin may be determined by artificial intelligence configured with historical sensor data. For example, a test vehicle equipped with sensors may permit a neural network or a decision tree to be trained based on sensor data representative of vehicle travels on particular roads, or under certain conditions. Such test data could be used to predict a minimum safe risk margin threshold differential with respect to the incident risk determined by the RMCC, for various live autonomous vehicle driving conditions. In an illustrative example, various embodiment RMCC may determine the incident risk for each vehicle as safe, dangerous, or unsafe, characterized as a function of an incident risk, incident risk margin, and a minimum safe risk margin threshold.

The depicted method continues at 1604 with the RMCC determining the locations of the multiple autonomous vehicles based on the sensor data received from the multiple vehicles. At 1606, the RMCC determines the locations of objects based on the sensor data. Using the sensor data, the RMCC determines the vehicle speeds at 1608. At 1610, the RMCC determines the incident risk for each of the multiple vehicles, based on the vehicle locations, object locations, and vehicle speed. In some examples, the incident risk may be determined as a function of whether an object or vehicle is of interest to one or more of the multiple vehicles.

At 1612 the RMCC determines if the incident risk level is safe for each vehicle of the multiple autonomous vehicles, based on the incident risk evaluated for each vehicle as a function of an incident risk margin determined by artificial intelligence configured with historical sensor data. If the incident risk level for each vehicle is safe and the RMCC is not in control of the autonomous vehicle at step 1614, the process continues at 1602. If the incident risk level is safe and the RMCC is in control of the autonomous vehicle at step 1614, the RMCC returns control to the vehicle at 1616, and the process continues at 1602.

At step 1612, if the incident risk level is not safe, the RMCC determines at step 1618 if the incident risk level is dangerous, based on the incident risk evaluated for each vehicle as a function of an incident risk margin determined by artificial intelligence configured with historical sensor data. If the RMCC determines at step 1618 the incident risk level for one or more vehicle is dangerous, the RMCC processes an advisory to generate a recommendation message sent to the one or more vehicle at 1620. In various examples, the advisory recommendation may include a suggestion to the autonomous vehicle to reduce speed, or may include an image of an object, for example a pedestrian occluded from the vehicle's field of view.

If the RMCC determines at step 1618 the incident risk level is not dangerous, the RMCC determines at step 1622 if the incident risk level for each vehicle is unsafe, based on the incident risk evaluated for each vehicle as a function of an incident risk margin determined by artificial intelligence configured with historical sensor data. If the RMCC determines at 1622 the incident risk level for at least one vehicle is unsafe, the RMCC at 1624 takes control of the at least one vehicle, and the method continues at 1602 with the processor 503 capturing sensor data from multiple autonomous vehicles. In an illustrative example, an embodiment RMCC may determine incident risk simultaneously for each of a plurality of autonomous vehicles, assuming simultaneous control of one or more of the plurality of vehicles where the risk level is not safe. For example, an embodiment RMCC could be monitoring one hundred vehicles, and at a given time, perhaps fifty of the one hundred vehicles may be determined in need of control by the RMCC based on an unsafe incident risk level determined by the RMCC for each of the fifty vehicles.

Figure 17:
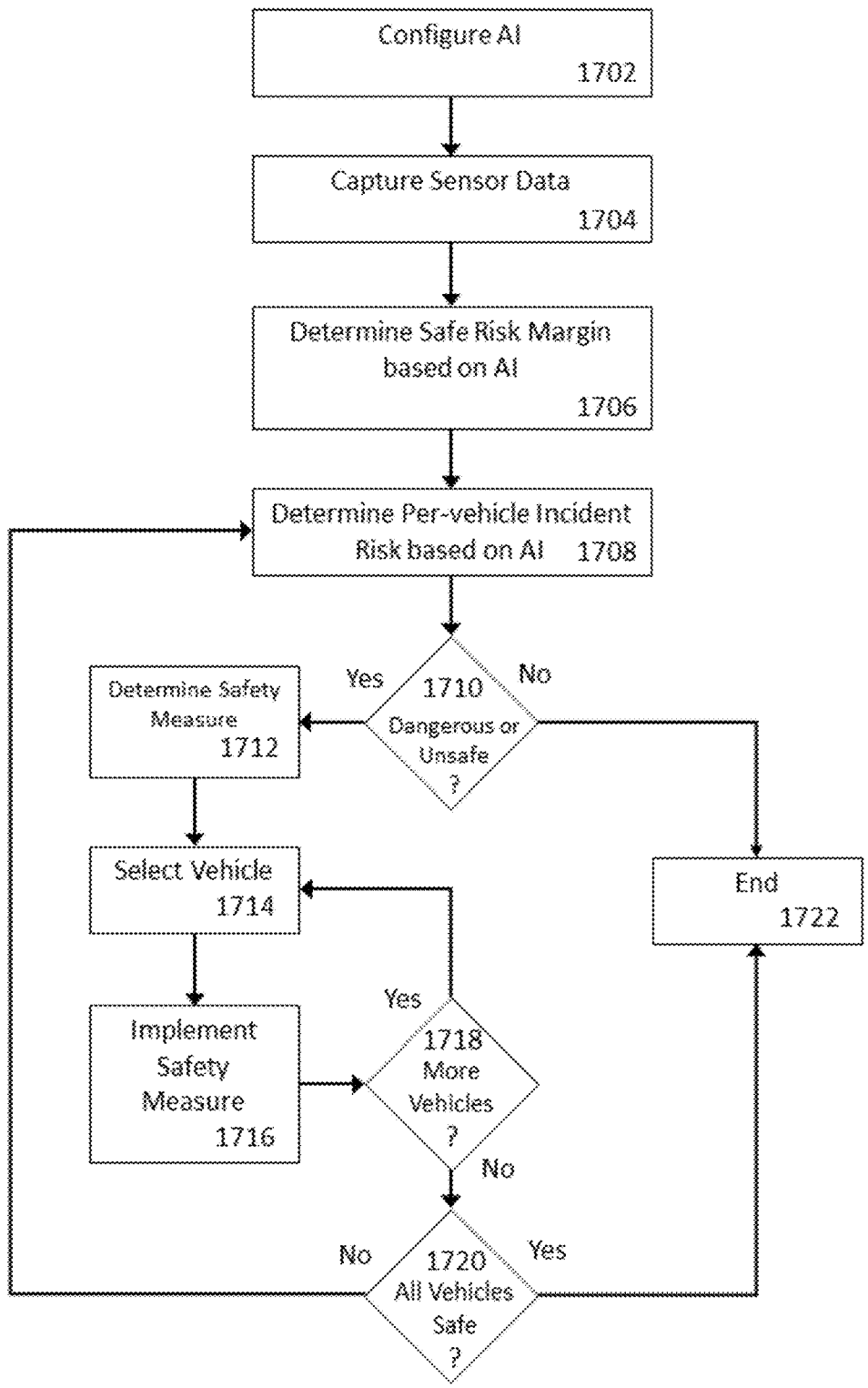
FIG. 17 is a flowchart illustrating an example process for mitigating incident risk for multiple autonomous vehicles by an exemplary RMCC.

FIG. 17 is a flowchart illustrating an example process for mitigating incident risk for multiple autonomous vehicles by an exemplary RMCC. In various examples, the process depicted by FIG. 17 may be implemented in vehicles 103*a*, 103*b*, or 103*c*, and implemented in the RMCC 109, in the AI system 100 (FIG. 1). The exemplary remote monitoring and control (RMCC) process depicted by FIG. 17 is given from the perspective of the processor 503 (FIG. 5). The illustrated process begins at step 1702 with the processor 503 configuring an embedded artificial intelligence to predict a safe risk margin determined as a function of live sensor data and historical sensor data. The process continues at step 1704 with the RMCC capturing live sensor data from the multiple autonomous vehicles. At 1706, the RMCC determines the safe risk margin based on the artificial intelligence and the live sensor data.

At step 1708, the RMCC determines the per-vehicle incident risk for each of the multiple autonomous vehicles, based on the artificial intelligence and the live and historical sensor data. If the RMCC determines at step 1710 the incident risk level for all vehicles is not dangerous or unsafe, the process ends, otherwise, the RMCC mitigates the dangerous or unsafe incident risk for at least one of the multiple autonomous vehicles by choosing at 1712 an appropriate safety measure determined by artificial intelligence. At step 1714 the RMCC selects a vehicle to implement the chosen safety measure at 1716. In various examples, the safety measure may include automatic vehicle braking, reducing speed, or steering away from a potential collision.

At 1718 the RMCC determines if more of the autonomous vehicles need to implement safety measures to reduce the incident risk level to a safe margin. If more vehicles need safety measures, the RMCC continues selecting a vehicle at 1714 to implement the safety measure at 1716. If all vehicles have implemented safety measures, the RMCC determines at 1720 if the incident risk level for all vehicles has been reduced to a safe margin. If the RMCC determines at 1720 all vehicles are not operating at a safe risk incident level, the process continues at 1708.

Although various examples have been described with reference to the Drawings, other examples are possible. For example, various embodiment RMCC implementations may include an improved distributed information sharing system and methods for monitoring and controlling an autonomous vehicle, the RMCC programmed and configured to receive information from a plurality of distributed sensors; determine the existence of an incident, vehicles, passengers, pedestrians, animals and objects involved in the incident, a nature of the injuries and damages from the incident; determine if the autonomous vehicle can be safely moved autonomously from a location where the incident occurred to a second location; contact an emergency responder when the vehicle cannot be safely moved autonomously; receive a request to transfer control of the vehicle from an emergency responder user device; and in response, transfer control of the automated vehicle to a trusted emergency responder without requiring approval from an owner of the vehicle using encryption and handshake techniques; and notify an owner or interested party of the vehicle of the incident.

In an illustrative non-limiting example illustrative of various embodiments' design and usage, by exchanging basic traffic messages among vehicles for safety applications, a significantly higher level of safety can be achieved when vehicles and designated infrastructure-locations share their sensor data. While cameras installed in one vehicle can provide visual information for mitigating many avoidable accidents, a new safety paradigm is envisioned where visual data captured by multiple vehicles are shared and fused for significantly more optimized active safety and driver assistance systems. The sharing of visual data is motivated by the fact that some critical visual views captured by one vehicle or by an infrastructure-location are not visible or captured by other vehicles in the same environment. Sharing such data in real-time provides an invaluable new level of awareness that can significantly enhance a driver assistance, connected vehicle, and/or autonomous vehicle's safety-system.

In at least some aspects, the present invention is directed to methods and systems for operation of an autonomous vehicle. More specifically, some embodiments of the present invention are directed to methods and systems to handoff control of an autonomous vehicle to an emergency responder that is human or autonomous or a human vehicle occupant, in the event of an accident or other emergency situation.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. All functionalities described above could also be provided by private or Public cloud-based Data Centers (DC).

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The flowcharts of FIGS. 2, 3, 4, 8, 9, 16, and 17 show the functionality and operation of an implementation of portions of the autonomous vehicles 103a, 103b, and 103c, the RMCC 109, and the AI system 100 application(s) 515. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2, 3, 4, 8, 9, 16, and 17 show a specific order of execution, it is understood that the order of execution may differ from that which is depicted. For example, the order of execution of two or more blocks may be scrambled relative to the order shown. Also, two or more blocks shown in succession in FIGS. 2, 3, 4, 8, 9, 16, and 17 may be executed concurrently or with partial concurrence. Further, in some embodiments, one or more of the blocks shown in FIGS. 2, 3, 4, 8, 9, 16, and 17 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the AI system application(s) 515 and/or application(s) 521, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. An autonomous vehicle remote monitoring and control center (RMCC) apparatus, comprising:
at least one processing device, the RMCC programmed and configured to:
receive sensor data captured by a plurality of sensors distributed across a plurality of independently governed autonomous vehicles operating remotely from the RMCC, the sensor data including data of vehicles not operating under control of the RMCC;
simultaneously determine an incident risk level of each of the plurality of independently governed autonomous vehicles operating remotely from the RMCC, wherein the incident risk level is determined based on artificial intelligence trained as a function of received fused image sensor data captured by the plurality of sensors distributed across the plurality of autonomous vehicles, and wherein the incident risk level is determined based on a criterion determining whether an object visually encoded by the fused image sensor data captured from one vehicle is of interest to at least another of the vehicles;
in response to the incident risk level determined as not safe by the RMCC for one or more of the plurality of independent vehicles, take control of the one or more of the plurality of autonomous vehicles operating at the incident risk level that is not safe, to restore the vehicles operating at the incident risk level that is not safe to a safe incident risk level; and,
in response to determining the incident risk has been restored to the safe incident risk level, return control to the one or more autonomous vehicles that were operating at the incident risk level that was not safe.

2. The apparatus of claim 1, wherein the apparatus further comprises the RMCC programmed and configured to determine the incident risk level based on artificial intelligence configured as a function of the sensor data received from the plurality of autonomous vehicles.

3. The apparatus of claim 1, wherein the apparatus further comprises the RMCC programmed and configured to determine an incident risk margin calculated as a function of comparing the incident risk level with a predetermined minimum safe risk level threshold.

4. The apparatus of claim 3, wherein the apparatus further comprises the RMCC programmed and configured to determine the incident risk level is unsafe based on determining the incident risk margin is less than a predetermined safe minimum risk margin.

5. The apparatus of claim 3, wherein the apparatus further comprises the RMCC programmed and configured to determine the incident risk level is dangerous based on determining a slope of the incident risk margin sampled for a predetermined time period is negative.

6. The apparatus of claim 3, wherein the apparatus further comprises the RMCC programmed and configured to determine the incident risk level is safe based on determining the incident risk margin is equal to or greater than a predetermined safe minimum risk margin.

7. An autonomous vehicle remote monitoring and control center (RMCC) apparatus, comprising:
at least one processing device, the RMCC programmed and configured to:
receive sensor data captured by a plurality of sensors distributed across a plurality of independently governed autonomous vehicles operating remotely from the RMCC, the sensor data including data of vehicles not operating under control of the RMCC;
determine an incident risk level for each one of the plurality of independently governed autonomous vehicles operating remotely from the RMCC, wherein the incident risk level is determined based on artificial intelligence trained as a function of received fused sensor data captured by the plurality of sensors distributed across the plurality of autonomous vehicles, and wherein the incident risk level is determined based on a criterion determining whether an object visually encoded by the fused sensor data captured from one vehicle is of interest to at least another of the vehicles;
determine an incident risk margin calculated as a function of comparing the incident risk level with a predetermined minimum safe risk level threshold;
in response to determining the incident risk margin is less than the predetermined safe minimum risk margin:
take control of one or more of the plurality of autonomous vehicles operating with the incident risk margin less than the predetermined safe minimum risk margin, to restore a safe incident risk level by implementing one or more safety measure in at least one vehicle; and,
in response to determining the incident risk has been restored to a safe incident risk level based on comparing the incident risk to the predetermined safe minimum risk margin, return control to the one or more autonomous vehicles operating with the incident risk margin less than the predetermined safe minimum risk margin; and,
in response to determining the incident risk margin is equal to or greater than a predetermined safe minimum risk margin, determine the incident risk level is safe.

8. The apparatus of claim 7, wherein the fused sensor data further comprises data encoding an object image captured from at least one of the plurality of autonomous vehicles imposed on a field of view image captured from another vehicle not operating under the RMCC.

9. The apparatus of claim 7, wherein the fused sensor data further comprises data encoding location.

10. The apparatus of claim 7, wherein the fused sensor data further comprises data encoding a separation distance between one vehicle of the plurality of vehicles and at least one other vehicle of the plurality of vehicles.

11. The apparatus of claim 7, wherein the fused sensor data further comprises data encoding a distance between one vehicle of the plurality of vehicles and a fixed object.

12. The apparatus of claim 7, wherein the safety measure further comprises increasing a separation distance between at least two vehicles based on changing a velocity of at least one vehicle of the plurality of vehicles.

13. The apparatus of claim 7, wherein the safety measure further comprises changing a direction of at least one vehicle to avoid collision.

14. An autonomous vehicle remote monitoring and control center (RMCC) apparatus, comprising:
at least one processing device, the RMCC programmed and configured to:
receive sensor data captured by a plurality of sensors distributed across a plurality of independently governed autonomous vehicles operating remotely from the RMCC, the sensor data including data of vehicles not operating under control of the RMCC;
determine an incident risk level of the plurality of independently governed autonomous vehicles remote from the RMCC, wherein the incident risk level is determined based on artificial intelligence trained as a function of received fused image sensor data captured by the plurality of sensors distributed across the plurality of autonomous vehicles, and wherein the incident risk level is determined based on a criterion determining whether an object visually encoded by the image sensor data captured from one vehicle is of interest to at least another of the vehicles;
determine an incident risk margin calculated as a function of comparing the incident risk level with a predetermined safe risk level threshold, wherein the safe risk level threshold is predetermined by artificial intelligence configured as a function of historical training data captured by a test vehicle sensor;
in response to determining the incident risk margin is less than a predetermined safe minimum risk margin:
take control of one or more of the plurality of autonomous vehicles operating at the incident risk margin that is less than the predetermined safe minimum risk margin, to restore a safe incident risk level for the vehicles based on governing the operation of the plurality of vehicles to increase the separation distance between at least two vehicles based on changing the velocity vector of at least one vehicle of the plurality of autonomous vehicles; and,
in response to determining the incident risk has been restored to a safe level based on comparing the incident risk to the predetermined safe minimum risk margin, return control to the one or more of the plurality of autonomous vehicles; and, in response to determining the incident risk margin is equal to or greater than a predetermined safe minimum risk margin, determine the incident risk level is safe;

in response to determining the existence of an incident based upon the information received from the plurality of distributed sensors:

determine vehicles, passengers, pedestrians, animals and objects involved in the incident and a nature of injuries and damages to the vehicles, passengers, pedestrians, animals and objects involved in the incident based on the information received from the sensors;

determine if the autonomous vehicle can be safely moved autonomously from a location where the incident occurred to a second location; and, in response to determining the autonomous vehicle can safely be moved to the second location autonomously, move the vehicle to the second location and park the vehicle.

15. The apparatus of claim 14, wherein the apparatus further comprises the RMCC programmed and configured in response to determining the incident risk level is safe, to display a human-visible green indication on an RMCC monitor.

16. The apparatus of claim 14, wherein the apparatus further comprises the RMCC programmed and configured in response to determining the incident risk level is dangerous, to display a human-visible yellow indication on an RMCC monitor.

17. The apparatus of claim 14, wherein the apparatus further comprises the RMCC programmed and configured wherein in response to determining the incident risk level is unsafe, display a human-visible red indication on an RMCC monitor.

18. The apparatus of claim 1, wherein the apparatus further comprises the RMCC programmed and configured to:

determine when at least one autonomous vehicle of the one or more autonomous vehicles cannot be moved safely from the location where an incident occurred to a second location;

contacting an emergency responder and providing the emergency responder with information including a number of vehicles, passengers, and pedestrians, animals and objects involved in the incident and the nature of injuries and damages sustained to the vehicles, passengers, pedestrians, animals and objects involved in the incident;

determine when the emergency responder arrives at the at least one automated vehicle based on information received from the plurality of distributed sensors; and in response to a request from an emergency responder user device to transfer control of the vehicle to the emergency responder user device, transfer control of the autonomous vehicle to the emergency responder without requiring approval from an owner of the vehicle.

19. The apparatus of claim 7, wherein the request from the emergency responder is required to contain a unique identification number and be communicated from the emergency responder user device to the RMCC using encryption techniques, and the unique identification number of the emergency responder is stored in the RMCC as trusted.

20. The apparatus of claim 7, wherein the apparatus further comprises the RMCC programmed and configured to determine the incident risk level is unsafe based on determining the incident risk margin is less than a predetermined safe minimum risk margin.

21. The apparatus of claim 20, wherein the apparatus further comprises the RMCC programmed and configured to determine the incident risk level is dangerous based on determining a slope of the incident risk margin sampled for a predetermined time period is negative.

22. The apparatus of claim 7, wherein the fused sensor data includes information on one or more variables that are used in system parameter calculations, wherein the variables include data on two or more: vehicles, pedestrians, expected collision points, vehicle width, vertical and horizontal distances between vehicles, distance and angles between vehicles and pedestrians, Euclidian distance between vehicles and pedestrians, and altitude difference between two cameras.

23. The apparatus of claim 7, wherein the fused sensor data is analyzed to detect and identify objects of interest, such as a pedestrian, another vehicle or other potential hazards using a You Only Look Once (YOLO) object detection algorithm.

* * * * *